(12) United States Patent
Kociecki

(10) Patent No.: US 6,198,642 B1
(45) Date of Patent: Mar. 6, 2001

(54) COMPACT MULTIPLE OUTPUT POWER SUPPLY

(75) Inventor: John Kociecki, Powell, OH (US)

(73) Assignee: Tracewell Power, Inc., Westerville, OH (US)

( * ) Notice: Subject to any disclaimer, the term of this patent is extended or adjusted under 35 U.S.C. 154(b) by 0 days.

(21) Appl. No.: 09/420,664

(22) Filed: Oct. 19, 1999

(51) Int. Cl.[7] ..................................... H02M 5/45
(52) U.S. Cl. .................... 363/37; 363/65; 363/141; 307/42; 307/150; 307/155
(58) Field of Search ................... 307/11, 31, 38, 307/33, 150, 82, 155; 363/65, 37, 141, 144, 127; 361/704, 707, 715, 741

(56) References Cited

U.S. PATENT DOCUMENTS

| | | | |
|---|---|---|---|
| 5,184,025 | * 2/1993 | McCurry et al. | 363/65 |
| 5,258,887 | * 11/1993 | Fortune | 361/720 |
| 5,530,635 | * 6/1996 | Yashiro | 363/65 |
| 5,808,867 | * 9/1998 | Wang | 361/695 |
| 5,875,104 | * 2/1999 | Prager | 363/65 |
| 5,930,112 | * 7/1999 | Babinski et al. | 361/695 |
| 5,940,288 | * 8/1999 | Kociecki | 363/144 |

* cited by examiner

Primary Examiner—Peter S. Wong
Assistant Examiner—Gary L. Laxton
(74) Attorney, Agent, or Firm—Mueller and Smith, L.P.A.

(57) ABSTRACT

A compact multiple output power supply which has a circuit architecture with distinct primary and secondary circuit domains. Within the secondary circuit domain, a distribution bus of relatively low constant voltage supplies power inputs to d.c.-to-d.c. converters providing regulated outputs and operating independently of each other. Because of the secondary circuit domain topology, surface mount components are made available in conjunction with relatively simple converter circuitry. Heat management within the compact housing of the power supply is achieved through the utilization of linear driven air flows in combination with employment of heat sinks extending to the heat sink configured cover of the housing. Additionally, the highest heat generation components are positioned rearwardmost within the driven air path.

32 Claims, 17 Drawing Sheets

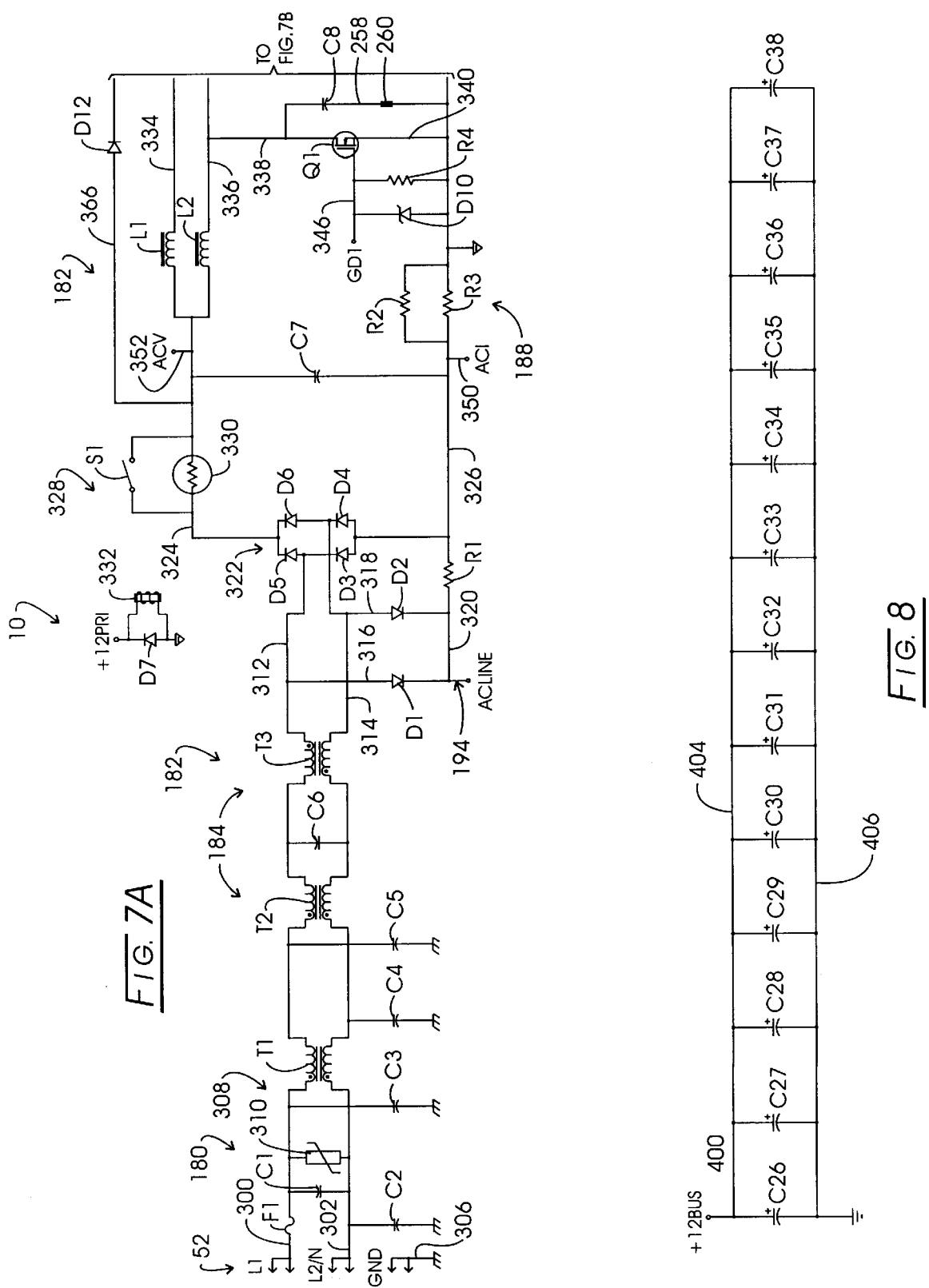

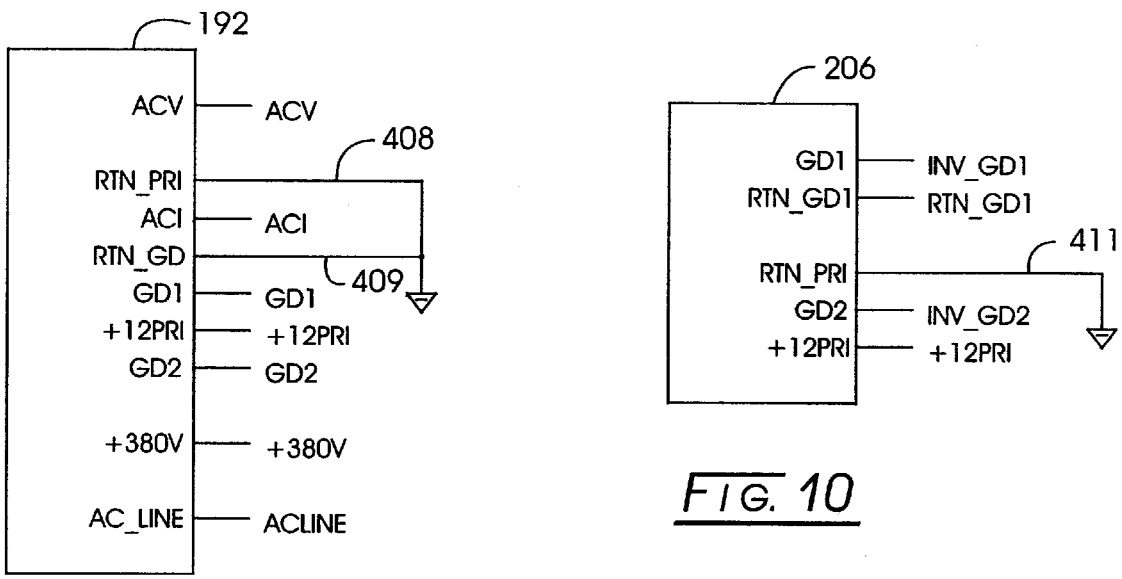
FIG. 9
FIG. 10
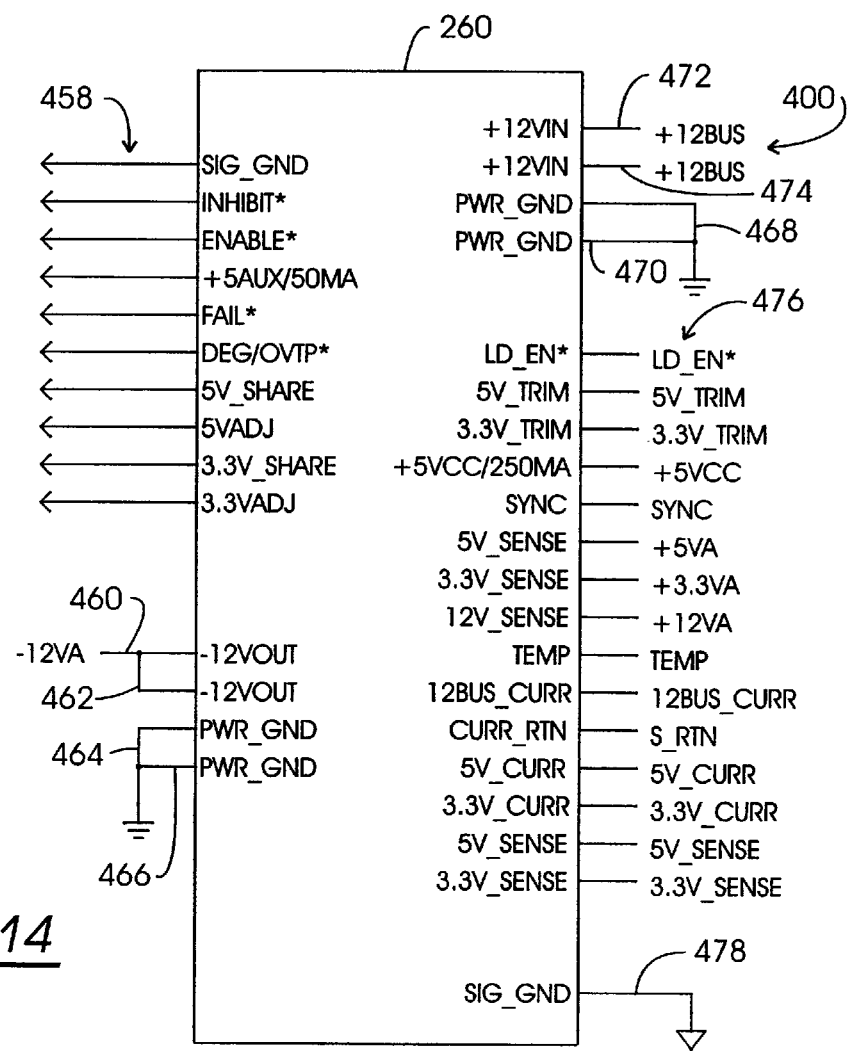
FIG. 14

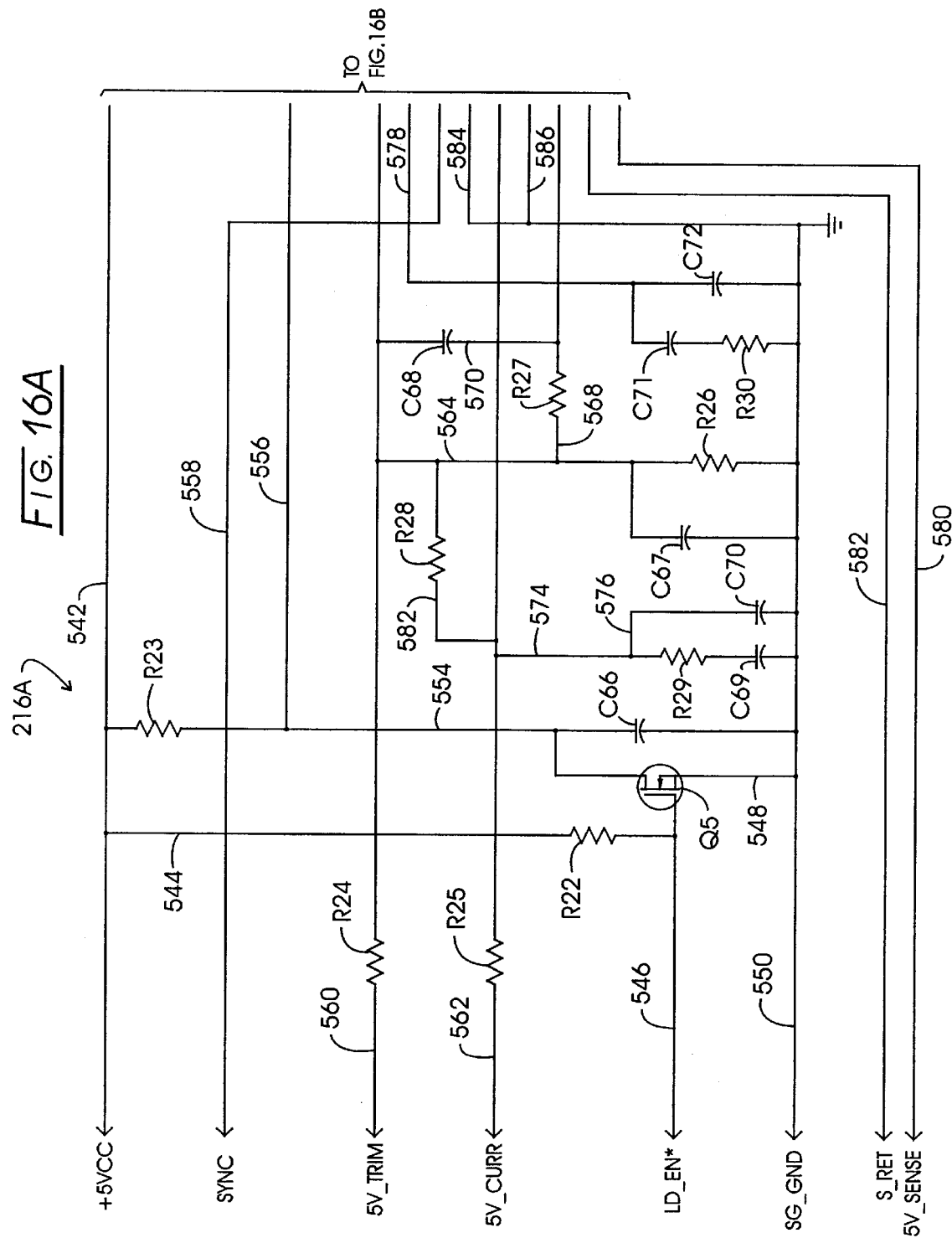

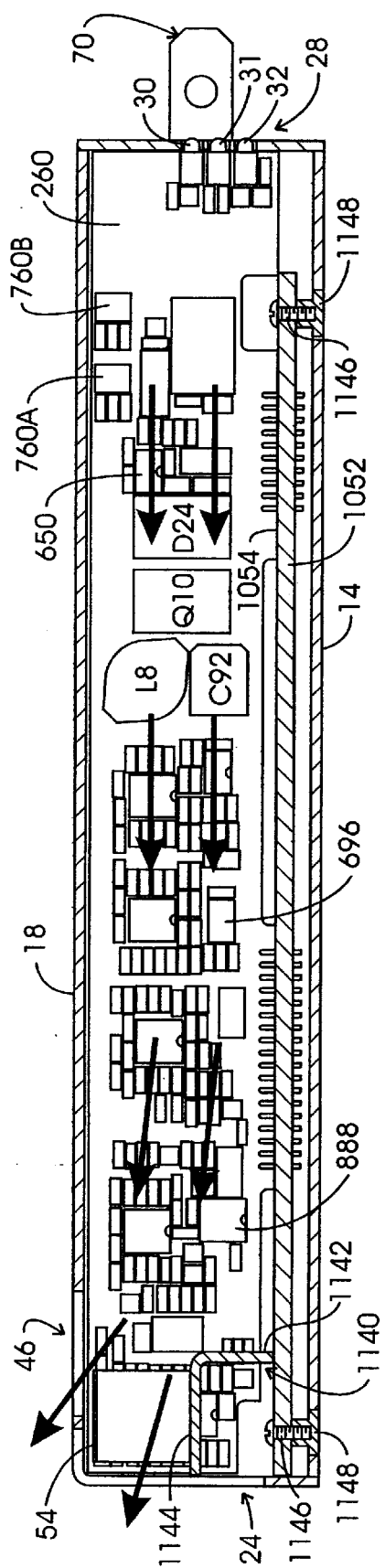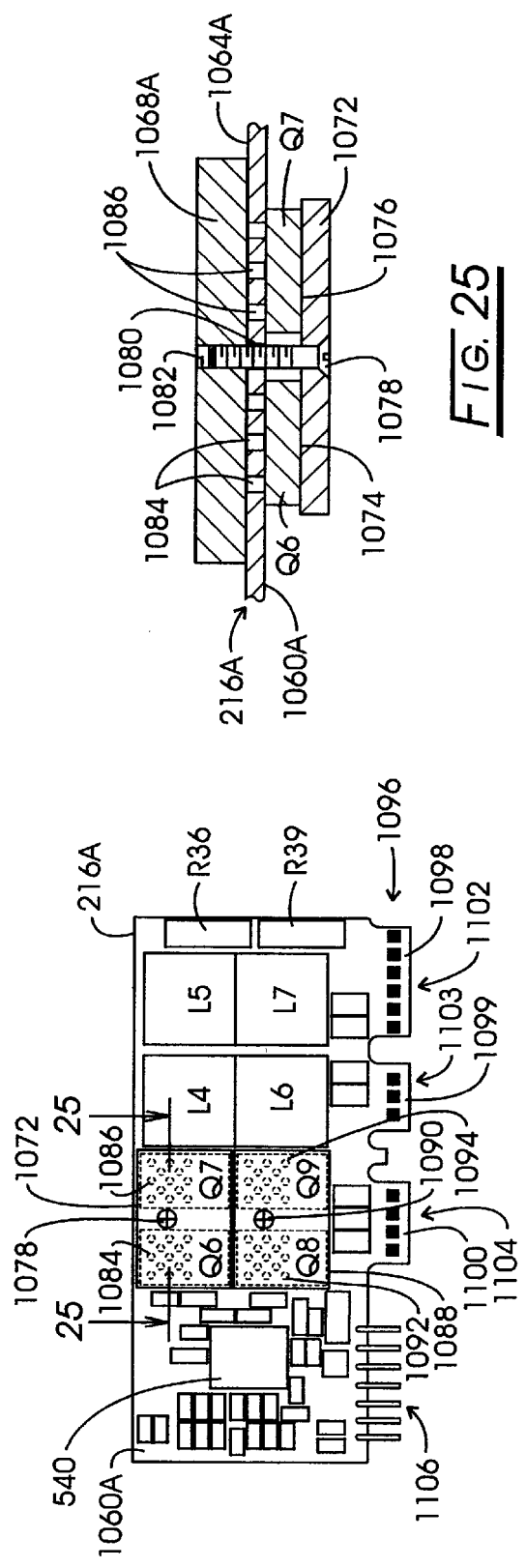
FIG. 26
FIG. 25
FIG. 24

COMPACT MULTIPLE OUTPUT POWER SUPPLY

CROSS-REFERENCE TO RELATED APPLICATIONS

STATEMENT REGARDING FEDERALLY SPONSORED RESEARCH

Not applicable.

BACKGROUND OF THE INVENTION

An expanding sector of the electronic industry is involved with the design and production of equipment for systems deemed to have a "high availability application". The designers of such equipment strive to assure that the systems will not fail. High availability systems generally are called for by industries involved in telecommunications, banking, security, the internet and the like.

Inasmuch as the cognizant industry is aware that essentially all electrical equipment will fail at some point in time, design efforts have considered, for example, redundancy, now termed "N+1 redundancy". Additionally, over the recent past, failure warning systems and improved access for fault correction has been incorporated into the systems. Typically, these systems comprise a series of somewhat elaborate circuits which are mounted upon circuit boards the combination of which are referred to as "cards". These cards are mounted within the sub-rack or "card cage" of a housing referred to as a "chassis" or "sub-rack" within which additionally are mounted a backplane, serving to interconnect the cards and a power supply. Such power supplies have colloquially been referred to as "shoebox" power supplies since their size and shape has resembled such a container. In light of their bulk, the power supplies traditionally have been bolted to an associated chassis rearwardly of the backplane and coupled to it with cabling.

Over a period of time, a number of industry standards have been promulgated or are in the process of being developed both with respect to backplanes and their associated power supplies. Among these standards are "VME BUS", the term VME representing a backplane/bus structure referred to as "versa module Europe", developed by Motorola/Mostek/Signetics-Phillips A "VXI consortium" of industry and government evolved "VXI" specification for a VXI/VME back-plane/bus. More recently, a "Compact-PCI" standard has been promulgated by the industrial computer IC Manufacturers Group. In general, these specifications look to various aspects of system environmental requirements such as airflow, power source derived voltage outputs, connector pin assignments, protocols and the like. Specified power supplies are required with the standards which are manifested as a sequence of voltage outputs which must remain within defined tolerances.

As the systems have increased in complexity, a need was perceived for a chassis or mainframe structure having a controlled and monitored environment, both with respect to cooling airflow and with respect to power supply performance. Tracewell, in U.S. Pat. No. 5,168,171, issued in 1992, described a circuit enclosure which incorporates a microprocessor-driven support system functioning to monitor the status of power supplies, which provides an improved cooling airflow path and further provides temperature monitoring. Importantly, the status information and system controls were established at a user accessible supervisory panel mounted at the front face of the enclosure. Sold under the trade designation "Intelligent Mainframe", the improved enclosure design found ready acceptance in the electronics industry.

Providing such forward access has become an important aspect for high availability systems. Where a component such as a card or power supply fails or deteriorates to evoke a warning status, it is important that service personnel be capable of replacing it promptly. Being able to carry out that prompt servicing calls for front access to the components mounted in the mainframe. To further facilitate such rapid and relativity straight forward component exchange, standards organizations are commending to specify a feature wherein components are plugged into the system from the forward location while it is actively running. This feature is referred to as "hot swapping". One approach to providing power supplies which are accessible from the front of the mainframe is described in U.S. Pat. No. 5,940,288, issued Aug. 17, 1999 by Kociecki, entitled "Card Cage Mounted Power Supply With Heat Dissipating Architecture". The power supply described therein is thin, having a standard slot height and is inserted within a card slot in the same manner as a card. Heat removing airflow is provided to the power supply by the cooling fans which also are utilized to remove heat from the array of cards. Because the power supplies are connected into the backplane by a conventional pin array the necessity for bolted cable connections utilizing rather robust studs is eliminated and the capability for carrying out hot swapping is achieved.

As the systems at hand have become more complex, however, a concomitant requirement for additional card slot space has arisen. Thus, a need is present for a modular form of power supply which is forwardly accessible and exhibits a small size or form factor permitting it to be mounted adjacent the card cage without interfering with that function. This calls for not only diminutive volumetric sizes of the power supply but correspondingly small and preferably multitask handling structures.

Power supplies which are intended for use in more sophisticated electronic systems as referred to above, are required to be of a multi-output variety, for instance making available 5 volt, 3.3 volt and ±12 volt outputs to the system designer. Traditionally, those multiple outputs have been derived with circuits employing a singular step-down transformer combined with a single a.c.-to-d.c. conversion network. While this design approach conserves circuit space and cost, the multiple outputs which result are somewhat interdependent and only one of these outputs will be regulated. Such interdependence of the outputs often results in their degradation. Circuit alterations provided to attempt correction of these defects generally call for undesirable compromises. More operationally satisfying, mutually independent multiple output stages have called for separate, independent transforming and conversion networks with attendant large and now more unacceptable size and cost requirements.

Over the recent past, multiple output power supplies with mutually independent outputs have been introduced which achieve a somewhat reduced package size through the utilization of pre-manufactured switching converters, permitting improved power packaging densities. Manufacturers offer them as "bricks", the converters generally being rectangularly shaped packages of typically flat configuration (i.e., one-half inch thickness), one side of which incorporates a heat transfer surface generally formed of aluminum. With the introduction of the switching converters, improved packaging and cooling techniques have been developed. See in this regard: Tracewell, et al, application for U.S. Pat. No. 5,945,746, entitled "Power Supply and Power Supply/ Backplane Assembly and System", issued Aug. 31, 1999; Tracewell, et al, U.S. Pat. No. 6,046,921 entitled "Modular Power Supply", filed issued Apr. 4, 2000; and U.S. Pat. No. 5,940,288 (supra).

Notwithstanding the provision of mutually independent multiple outputs, the size and costs of the devices remains the subject of the investigation. Smaller power supply sizes continue to be called for by systems designers. Such smallness in packaging with independent outputs combined with concomitant and important management of the heat generated by the supplies has remained a goal of power supply designers.

Another aspect of multiple output power supplies is concerned with their initial use during the development of an electronics system. System designers are called upon to compute the power demands associated with the system loads. The power supply manufacturers will provide the systems designer with an overall power supply rating in watts. However, since substantial variations occur with respect to the use of individual outputs, the power supplies are designed with power ratings for the individual outputs which, if combined as a whole, would exceed the overall power rating of the power supply. Thus, it is not unusual for the power supplies to be subjected to excessive power demands during such incipient design activities with resultant overheating and damage.

BRIEF SUMMARY OF THE INVENTION

The present invention is addressed to a multiple output power supply of compact size which is connectable by multiple pin connectors within a sub-rack of an electronics system. Configured to be hot swappable, the power supply conveniently may be accessed from the front of such electronic systems. The circuit employed with the power supply permits the noted compactness with a circuit architecture having a higher voltage primary circuit domain incorporating input signal treatment, inverter and stepdown components, and a secondary circuit domain performing in conjunction with a lower voltage, i.e. 12 volt, distribution output or bus. That distribution bus provides power input, inter alia to synchronous buck d.c.-to-d.c. converters which generate regulated outputs at user specified and controlled voltages. Because of the secondary circuit domain topology incorporating the lower voltage distribution bus, the regulating converters advantageously perform independently of one another, may be of relatively simple design and, importantly, may be configured with diminutive surface mount components. As a consequence, the daughter board mounted converter circuits, which essentially are identical for various regulated outputs, may be fabricated in substantial volume using economical robotic component placement systems.

Because the voltage at the distribution bus within the secondary circuit domain is constant in the absence of utility line input vagaries, It becomes a vehicle for monitoring the total power consumption of the system loads imposed upon the power supply. By uniquely monitoring current values at the distribution bus, which linearly correspond with power consumption, a limit function is made available to the systems designer. Thus, during system setup procedures, a comparison network is employed to disable the regulating converters when rated power values are exceeded. A visually perceptible output indicating a power limit excursion is presented to the systems designer on the occasion of a limit detection.

Management of the heat generated by circuit components within the compact housing of the power supply is achieved by component placement developing generally linear driven air flow paths; by the positioning of higher heat generation components within a thermally isolated air flow corridor; by positioning the components having the highest heat generation characteristics rearwardmost within the heat removing driven air pathway; and by a unique development of heat transfer and heat sink structuring within the housing. Daughter circuit boards supporting the regulating converters having power switching transistors surface mounted upon their front face, are configured with aluminum plate heat sinks attached to their opposite or rear faces. Heat is transferred from the power transistors through the circuit boards by a plurality of metalized channels or holes located behind the transistors which provide heat transfer paths through the circuit boards to the heat sinks. The circuit boards themselves are made thinner than those normally encountered to enhance this heat transfer from the power transistors. The noted isolating corridor air pathway is established through the use of an elongate heat transfer plate which is coupled to the top cover of the power supply housing in a heat exchange relationship. High heat dissipating components, for example, incorporated within the primary circuit domain, are attached to this heat transfer plate in thermal exchange relationship such that heat removal is provided through the housing cover, which performs as a heat sink, as well as by the isolated air flow. Larger components such as filtering and hold-up capacitors are mounted in linear arrays, aligned with the generally linear driven air paths.

Because the power supplies are insertable by hand within the sub-racks of electrical systems, a simple but effective technique is called for to provide for their removable mounting. This is achieved through the utilization of elongate polymeric slide members which function not only as slidable support components, but also as handles and latches.

Other objects of the invention will, in part, be obvious and will, in part, appear hereinafter. The invention, accordingly, comprises the apparatus possessing the construction, combination of elements and arrangement of parts which are exemplified in the following description.

For a fuller understanding of the nature and objects of the invention, reference should be had to the following detailed description taken in connection with the accompanying drawings.

BRIEF DESCRIPTION OF THE DRAWINGS

FIGS. 7A and 7B combine as labeled thereon to show portions of circuitry mounted upon a motherboard circuit board of the power supply of the invention;

FIG. 8 is an electrical schematic diagram showing an array of filtering capacitors employed with a power supply circuit of the invention;

FIG. 9 is a block diagram showing a daughter board employed with the power supply which supports a PFC control and a primary control power supply;

FIG. 10 is a block diagram showing a daughter board employed with the power supply of the invention carrying an inverter control circuit;

FIG. 14 is a block diagram of a daughter board carrying control circuitry;

FIGS. 16A and 16B combine as labeled thereon to provide an electrical schematic diagram of a synchronous buck d.c.-to-d.c. converter according to the invention;

FIG. 24 is a plan view of a daughter board employed with the power supply of the invention;

FIG. 25 is a sectional view taken through the plane 25—25 shown in FIG. 24; and

FIG. 26 is a sectional view taken through the plane 26—26 shown in FIG. 3.

DETAILED DESCRIPTION OF THE INVENTION

In the discourse to follow, the general structure of the external features of the relatively diminutive power supply housing is described. Then, description is provided of the circuitry which incorporates a primary circuit domain (higher voltage) and a functionally associated secondary circuit domain (lower voltage) to achieve multi-output performance. Following the latter discussion, the description returns to the housing, disclosing the technique by which the extensive number of circuit components are laid out and mounted within the housing, including the techniques for carrying out effective heat management with the small housing involved. In effect, the mutually isolated dual circuit domain topology is in compliment with the housing supported component layout features to achieve a power supply which is relatively small in size, can be accessed from the forward side of an associated system chassis, inter alia, through the utilization of a rearwardly positioned multiple pin connector assemblage, and which is readily "hot swappable" within an N+1 redundancy mandated system environment.

Figure 1:
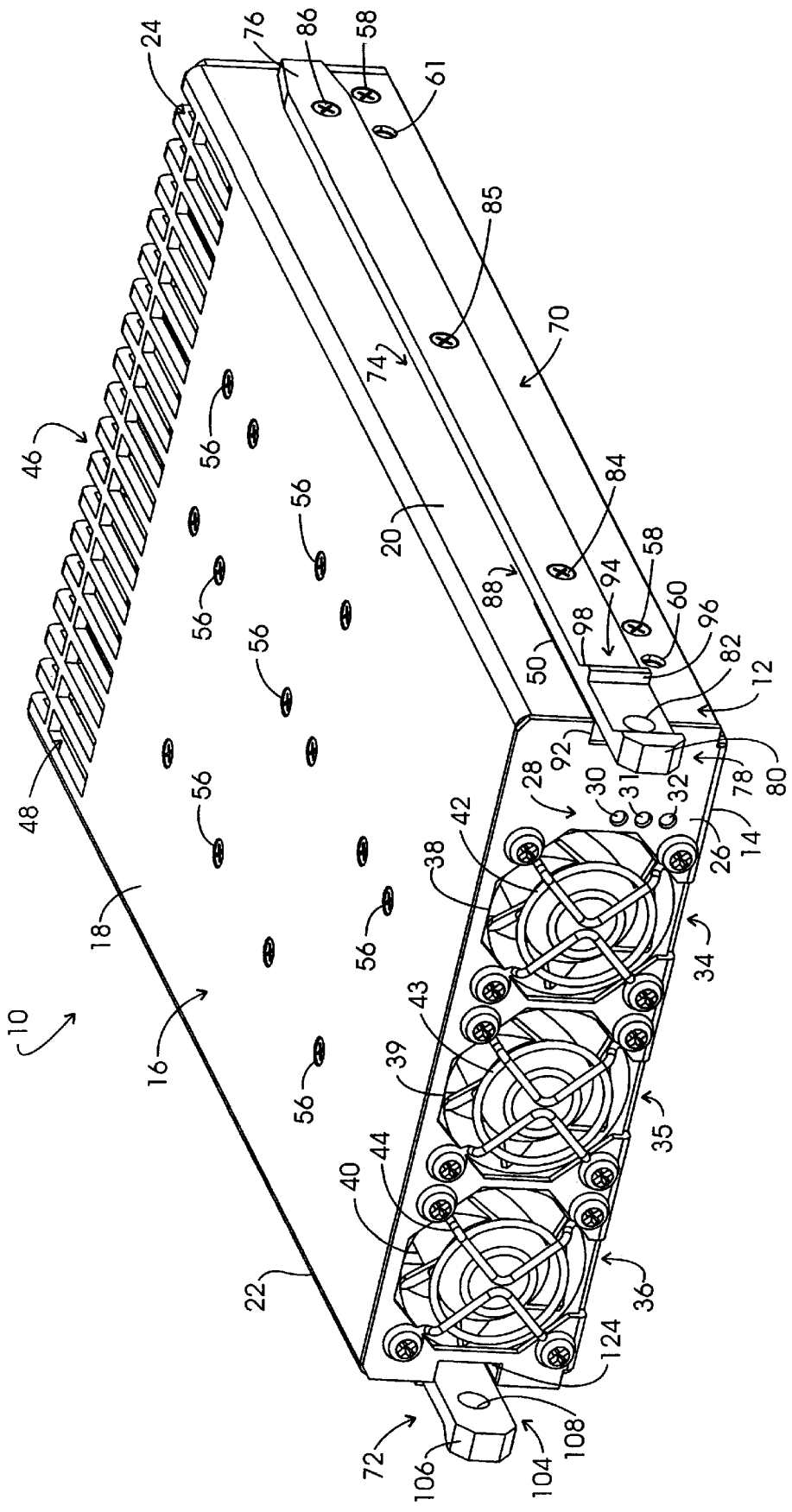
FIG. 1 is a perspective view of a power supply according to the invention.
Figure 3:
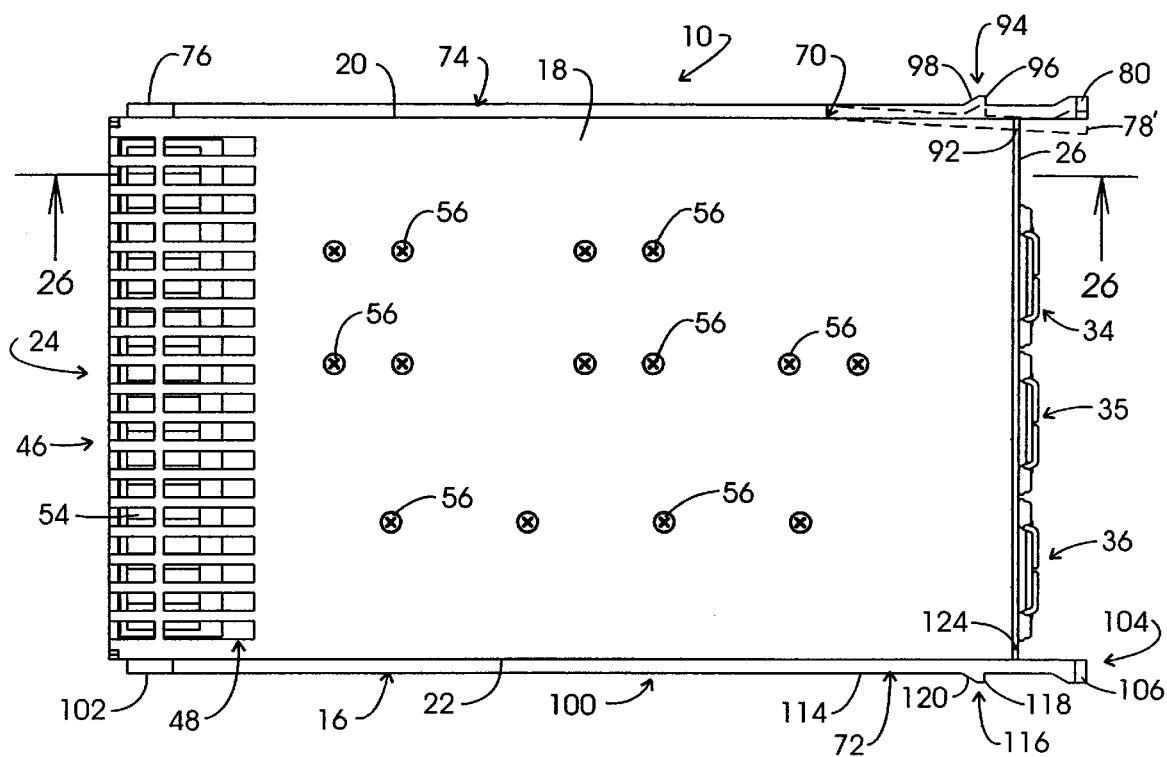
FIG. 3 is a top view of the power supply of FIG. 1.
Figure 4:
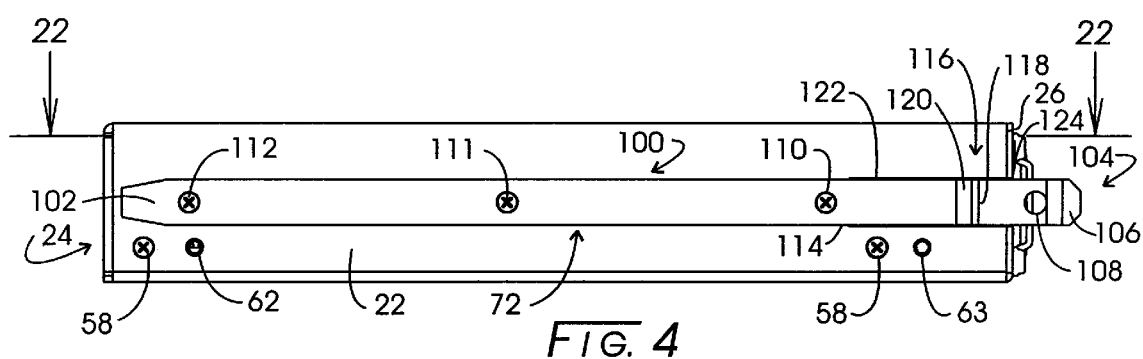
FIG. 4 is a left side view of the power supply of FIG. 1.

Referring to FIG. 1 a power supply according to the invention is represented generally at 10. Power supply 10 includes a housing represented in general at 12 which is formed with a sheet metal bottom side 14 over which an aluminum cover represented generally at 16 is positioned. Cover 16 is formed with a top portion 18, integrally formed sidewalls 20 and 22 and an integrally formed rear wall represented generally at 24. A sheet metal front panel 26 is attached at the forward face of housing 12. Three vertically aligned small round openings are provided in panel 26 to provide perceptible indicators which are implemented as light emitting diodes (LEDs). In this regard, an LED 30 is illuminated to provide an "input ok" indication as a green light output. LED 31 is illuminated in the yellow spectrum to indicate a "fault" condition of the power supply; and LED 32 is illuminated to identify a "power limit" condition. Front panel 26 also supports three fan assemblies represented generally at 34–36. The fans of these assemblies are positioned behind respective octagonal openings 38–40. Openings 38–40 are protected by respective grills 42–44. The fan assemblies 34–36 direct external air into the internal cavity of the housing 12, whereupon it is expelled from a grating represented generally at 46, the top portion of which is represented in general at 48. Looking additionally to FIG. 2, the rear wall 24 is revealed. Rear wall 24 includes the back portion 50 of grill 46 which is seen to extend about the rearwardly facing male component 52 of a multiple pin connector assembly. In general, the power supply 10 is inserted within a receiving cavity of a chassis to a position wherein a union is completed between the male connector component 52 and a chassis contained female connector component. The figure additionally reveals portions of an internally mounted folded fin array 54 having a cross-section somewhat resembling a squarewave. The array 54 is a component utilized in the heat management of power supply 10. FIGS. 1 and 3 reveal a plurality of machine screws certain of which are identified at 56. The screws 56 serve, inter alia, to connect internally disposed heat sinks to the cover 16 such that the cover participates in a heat removal function. Cover 16 is attached to the bottom side 14 by machine screws 58 as seen in FIGS. 1 and 4. Those figures also reveal access openings 60 and 61 as are formed within side 20 and 62 and 63 formed within side 22. These openings are aligned with internally attached nuts and permit an optional permanent mounting of power supply 10 within a chassis. The small housing 12 may exhibit, for example, a width of 6 inches, a length of 10 inches and a height of 1.75 inches, the latter representing a 1U rack height.

Because it is necessary to insert and remove the power supply 10 from the forward portion or face of a chassis or sub-rack, a form of mounting and grasping technique is called for by the systems designer. A supporting arrangement for the housing 10 within a chassis is developed utilizing two elongate, polymeric slide members represented generally at 70 and 72. Slide members 70 and 72 are formed of a resilient polymeric material such as a linear polyoxymethylene type acetyl resin having a high strength and solvent resistance which is moldable and sold under the trade designation, "Delrin"; or nylon, a generic designation for any long-chain synthetic polymeric amide which also is characterized by high strength, elasticity and resistance to water and chemicals. Slide member 70 exhibits a generally rectangular cross sectional configuration and is formed having a housing support portion represented generally at 74 which extends to a tapered rearward tip 76. The member 70 extends integrally forwardly from front panel 26 to provide a hand graspable handle portion shown generally at 78.

Handle portion 78 terminates in an integrally formed outwardly extending knob 80. Extending through the handle portion 78 at a location forwardly of panel 26 and rearwardly of knob 80 is a transversely disposed purchase hole 82. Hole 82 provides a purchase for a purchase rod to be used to gain leverage in removing housing 10 from a chassis receiving cavity. Such a purchase rod may, for example, be implemented as a common screwdriver. Slide member 70 is attached to sidewall 20 by machine screws 84–86. Screw 84 is positioned just rearwardly of an inflection location represented at 88. From this location 88, the side 20 is formed having an adjacently disposed side receiver slot which extends forwardly to panel 26. Within panel 26, there is formed a rectangular panel receiver slot 92. Located between the forward panel 26 and the inflection location 88 is an integrally formed latching tab represented generally at 94 which is configured having a transversely outwardly disposed abuttable forwardly facing engagement surface 96 and an inwardly sloping camming ramp 98 extending rearwardly therefrom. The side receiver slot 90 and the panel receiver slot 92 are provided having a depth effective to receive the slide member 70 in flexure such that the latching tab 94 may be moved inwardly for carrying out latching engagement and disengagement with the receiving cavity of a chassis. FIG. 3 portrays a portion of that flexure movement in phantom at 78'.

Referring to FIGS. 3 and 4, slide member 72 is seen to be identically configured. In this regard, it is seen to have a housing support portion shown generally at 100 which extends to a tapered rearward tip 102. A hand graspable handle portion is shown generally at 104 which terminates in an outwardly extending knob 106. Positioned rearwardly of knob 106 is a purchase hole 108 (FIGS. 1 and 4) and the slide member 72 is connected to side wall 22 by three machine screws 110–112 (FIG. 4). An inflection location 114 resides just forwardly of machine screw 110 and between that inflection location 114 and the front panel 26 is a latching tab represented generally at 116. Latching tab 116 is integrally formed with the slide member 72 and includes a forwardly facing engagement surface 118 and a rearwardly extending camming ramp 120. Aligned with the slide member 72 and extending inwardly within the sidewall 22 is a side receiver slot 122 (FIG. 4) which extends from adjacency with inflection point 114 to an aligning conjunction with a panel receiver slot 124 formed within front panel 26 (FIGS. 1 and 3). For latching operations, as in the case of slide member 70, the portion of slide member 72 located forwardly of inflection point 114 may be moved by flexure into and out of slots 122 and 124. This procedure functions to move the latching tab 116 away from and into engagement with a corresponding engagement component within a chassis receiving channel.

Figure 5:
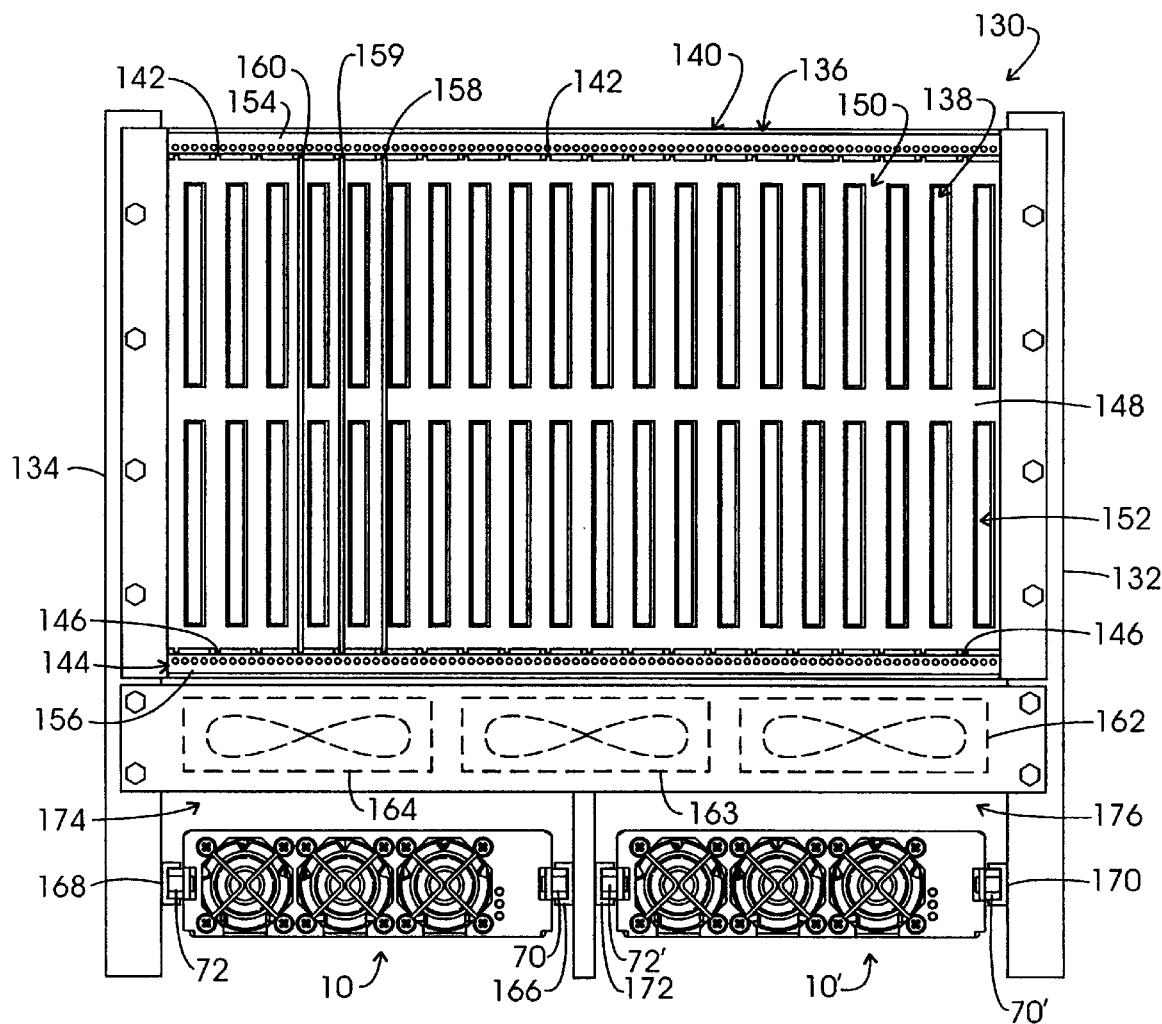
FIG. 5 is a front view of a sub-rack within which two power supplies according to the invention are mounted.

Referring to FIG. 5, one mounting of power supplies as at 10 within a chassis or sub-rack is demonstrated. In the figure, a chassis is represented generally at 130. Chassis 130, for example, may be mounted within a mainframe and includes two sides 132 and 134 and a top represented generally at 136. The upper portion of chassis 130 incorporates a card cage represented generally at 138. At the top 136 there is provided an upper rail assemblage represented generally at 140 incorporating an array of upper slots certain of which are revealed at 142. Slots 142 are located for each card or circuit board position. Aligned with the upper rail assemblage is a lower rail assemblage represented in general at 144 having an array of lower slots certain of which are identified at 146. At a rearward portion of the card cage 134 there is a vertically oriented backplane shown at 148 from which extends an upper array of connectors represented generally at 150 and an aligned lower array of connectors represented generally at 152. Top 136 additionally incorporates a downwardly extending component 154 which includes a linear array of guide holes for card guide component utilization and, similarly, a component 156 incorporating a linear array of guide holes extends upwardly from lower rail assemblage 144. The guide holes within component 156 serve the same function as those at component 154. Portions of three circuit boards or cards are shown at 158–160 mounted within card cage 134. Chassis 130 is configured such that air is caused to move through it by fans, which for the instant demonstration are positioned below card cage 134 and identified at 162–164.

Positioned for forward access in similar fashion as the cards 158–160, are two power supplies structured according to the invention and identified at 10 and 10'. So positioned, advantage may be taken of the forced air flow evolved from fans 162–164. Power supply 10 is removably mounted within the chassis 130 by the slidable insertion of its slide members 70 and 72 into respective channel-form rails 166 and 168 which are supported at a receiving cavity within the lower portion of the chassis. In similar fashion, corresponding slide members 70' and 72' of power supply 10' are slidably inserted within channel-form support rails shown respectively at 170 and 172. The receiving cavity within which power supply 70 is inserted is shown generally at 174, while the corresponding receiving cavity within which power supply 70' is inserted is represented generally at 176.

Figure 6:
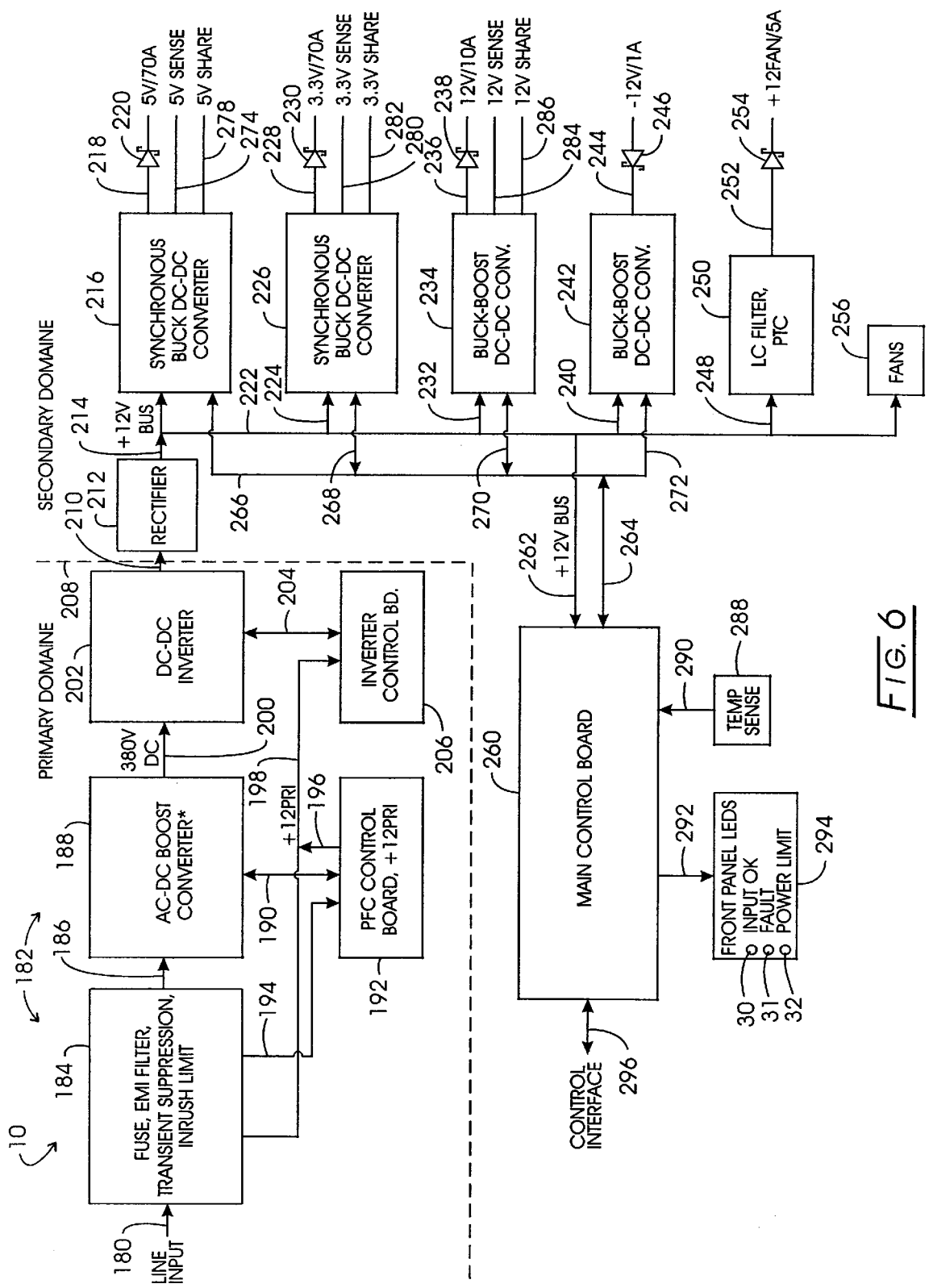
FIG. 6 is a block diagram of the circuit of the power supply of the invention showing primary circuit domain and secondary circuit domain boundaries.

Referring to FIG. 6, a block diagrammatic illustration of the dual circuit domain architecture of the circuitry of power supply 10 is revealed. Line input to the power supply 10 is represented at arrow 180. Physically this line input is an a.c. power input from a power utility, however, the power supply may be configured to perform in conjunction with a d.c. power input, for example, at a 48 volt level. This line input is directed to an input treatment network represented generally at 182. Network 182 includes somewhat conventional initial input treatment features as represented at block 184. This includes an initial fuse, an electromagnetic interference (EMI) filter network, a transient suppression function for protection against input line anomalies and an inrush limit function which serves to control current levels at start up in view of the presence of large, holdup and filtering capacitors included within high voltage d.c. regions of the circuit topography. The thus treated power input, here assumed to be an a.c. line input, as represented at arrow 186 is directed to the input of an a.c-d.c. boost converter as represented at block 188. This boost converter is controlled to carry out power factor correction (PFC) and, as represented by dual arrow 190 and block 192, is controlled by circuitry at a PFC control board. Such control involves a power factor control algorithm which responds to electrical parameters sensed at the a.c. input region, as represented at arrow 194, as well as at the boost converter switching region of block 188. The PFC control board also incorporates a network providing an auxiliary 12 volt output (+12 PRI) for supplying the circuit components within the primary circuit domain. This output is represented at arrows 196 and 198. Power factor correction, in effect, aligns the sinusoidal waveforms of current and voltage to evolve a more efficient current input. One task of this power factor correction circuit is to use a boost converter to convert the varying input voltage sinusoids to a constant, relatively high d.c. voltage. A boost converter functions to "boost" a lower voltage to a higher voltage by the controlled actuation of power transistors in conjunction with the energy storage activity of inductors.

This high level interim d.c. voltage is represented at arrow 200 and may be at a level, for example, of 380 volts, d.c.

Typical power supplies will introduce this high d.c. voltage output directly to the input of a d.c.-to-d.c. converter which incorporates self-contained inverter, step-down and rectifying functions from which multiple outputs typically are developed. That technique however, is somewhat expensive, complex and exhibits compromised efficiencies.

By contrast, the high level d.c. voltage output from the converter at block 188 is introduced to a quite simple zero voltage switching (ZVS) inverter as represented at block 202. Two power transistors are employed to implement this inverter function which, as represented at dual arrow 204 and block 206 are under the control of a control circuit mounted upon an inverter control board. This inverter function represented at block 202 is essentially a free running one which performs in conjunction with the primary side of a step-down transformer. The architecture of the instant circuitry incorporates the heretofore described, relatively higher voltage function within a primary circuit domain which is essentially isolated from a secondary circuit domain of lower voltage. A boundary between these two domains or sides is represented by a dashed boundary line 208. However it should be noted that the secondary side of the step-down transformer is within the noted secondary circuit domain. The highly efficiently and simply inverted and transformed output of the function at block 202 is represented at arrow 210. This output as represented at arrow 210 is one of a pulsating variety and is directed to a rectifier function represented at block 212. The rectification and attendant filtering functions represented at block 212 then create an intermediate, "12 volt bus" or d.c. voltage characterized distribution output within the secondary circuit domain which is represented, inter alia, at arrow 214. This intermediate bus has been developed utilizing highly efficient and simple ZVS inverter topology along with straight-forward transforming and rectification functions. The 12 volt voltage of this bus emanating at arrow 214 is substantially constant, being affected only upon the remote occurrences of aberrations in line power. In the latter regard, the simple and highly efficient inverter function represented at block 202 is a non-regulating, free running one thus, contributing to the desired simplicity evolved in developing this 12 volt distribution bus output.

With the distribution output, labeled as a 12 volt bus, as thus established within the secondary circuit domain, it is employed initially to provide the input to a series of very simple, low cost but high efficiency d.c.-to-d.c. converters which function to convert this 12 volt level to the necessary voltages required for multi-output performance. A level of 12 volts for the distribution bus function within the secondary circuit domain is developed with respect to an election to operate the 5 volt converter function at block 216 at about a 50% duty cycle. In this regard, the 12 volt level is approximately twice the value of the 5 volt regulated output and permits a highly efficient operation of it. As the d.c. input voltages to these converters increase in value, this efficiency tends to degrade. There are no high voltage to low voltage crossovers involved in this secondary circuit domain and the buck converters may be essentially of identical circuit design which is implemented with surface mount components. Thus, the converters can be assembled utilizing robotic placement techniques at a substantially high volume and lowered cost. Additionally, it will be seen that the converters have very little bulk, thus contributing to the diminutive size of the power supply. The approach has been referred to as a "cascade buck" architecture. This terminology evolved inasmuch as the ZVS inverter arrangement represented at block 202 employs a buck converter topology as do the converters within the secondary circuit domain which, are, in effect, in series with the primary circuit domain inverter, albeit with the intervention of transforming and rectification functions. Where the regulated output corresponds with the voltage level of the bus, then buck-boost d.c.-to-d.c. converter architecture is employed to accommodate for any spurious anomalies developed at the 12 volt bus in consequence of line variations. Thus, for regulated outputs which correspond with the bus voltage value, a buck-boost d.c.-to-d.c. converter topology is utilized, again being implemented with highly efficient, low cost circuits which can be structured employing surface mount components and thus robotically assembled.

This secondary circuit domain distribution bus feature also supplies power inputs to the control functions, as well as auxiliary power supplies provided for the convenience of the user. Of particular advantage with the architecture involved, each of the regulating converters is independent of the other and, thus, the quality of performance of power supply 10 is substantially enhanced.

The bus distribution output is seen to be directed, as represented by arrow 214, to a synchronous, buck d.c.-to-d.c. converter represented at block 216. Converter assembly 216 provides, for example, a +5 volt, 70 ampere regulated output as represented at output line 218. An ORing or blocking diode function is represented at diode symbol 220. This passive diode function permits the earlier described hot swapping feature. In effect this diode function 220 serves, in the event of a converter failure or the like, to block any flow of current back into the power supply 10 with the undesirable possibility of shorting out the entire system. The distribution bus is illustrated as continuing as represented at arrows 222 and 224 to provide, for example, a 12 volt power input to another synchronous buck d.c.-to-d.c. converter assembly represented at block 226. Structured essentially identically as the converter assembly represented at block 216, the converter assembly 226 provides, for example, a regulated 3.3 volt, 70 ampere output represented at line 228. Again, to develop the noted hot swapping function, an ORing or blocking diode arrangement is provided as represented at diode symbol 230.

The distribution bus feature represented at line 222 then continues, as represented at arrow 232, to provide, for example, a 12 volt power input to a buck-boost d.c.-to-d.c. converter assembly represented at block 234. As before, in view of the lower voltages involved, this converter has a simple and highly efficient topology and the functions, when the distribution bus exceeds 12 volts, as a buck converter and, when the +12 volt distribution bus function drops below that value, performs as a boost converter function. The result is a regulated 12 volt, 8 ampere output which is represented at line 236. Again, for hot swapping purposes, an ORing or blocking diode function is provided at the output 236 as represented by the diode symbol 238.

Distribution bus 222 further extends, as represented by arrow 240 to a buck-boost d.c.-to-d.c. converter function represented at block 242 which generates a regulated −12 volt, 1 ampere output as represented at line 244. As before, the circuit configuration for the converter function 242 is simple and implemented with surface mount components. The output at line 244 is protected by an ORing or blocking diode arrangement represented by the diode symbol 246.

Distribution bus 222 additionally functions to provide an unregulated +12 volt output for user convenience. As represented at arrow 248, the distribution bus 222 is seen to provide input to an inductive-capacitive filter (LC) function represented at block 250. That function represented at block 250 also includes a positive temperature coefficient thermister functioning to protect the power supply itself. The output of this service function is represented at line 252 incorporating an ORing or blocking diode assemblage represented by the diode symbol 254. The user, for example, may employ this output at line 252 for powering fans or other utilitarian needs. Finally, the distribution bus 222 is seen to provide power for the fan assemblies 34–36 (FIG. 1) as represented at block 256.

General control over the converter and other functions within the secondary circuit domain, as well as the provision of an interface with the system of the user is developed from a main control circuit which will be seen to be mounted upon a main control board. That function is represented at block 260. The main control 260 performs in conjunction with power supplied from the distribution bus as represented by arrows 222 and 262. The monitoring and control of converter function 216 is represented at arrows 264 and 266. Monitoring and control of the converter function 226 is represented by the latter arrows and arrow 268, while monitoring and control at converter function 234 is represented by arrows 264, 266 and 270. Such monitoring and control is provided with respect to converter function 242 as represented at arrows 264 and 272.

Among the monitoring features, the regulated 5 volt output provided at converter function 216 is monitored to derive a 5 volt sense signal represented at line 274. Similarly, current monitoring is provided as represented at line 278, to provide a 5 volt share signal which may be employed by the system user to derive equalized current delivery for duplicate regulators performing at the same output voltage level. In similar fashion, the 3.3 volt regulated output of converter function 226 is monitored, as represented at line 280, to provide a 3.3 volt sense signal and current output is monitored, as represented at line 282, to provide a 3.3 volt share signal. The output of converter function 234 is monitored, as represented at line 284, providing for the derivation of a 12 volt sense signal. Current monitoring to provide a 12 volt share signal is represented at line 286.

Temperature within the power supply 10 is monitored from the main control function 250. In this regard, a temperature sense signal is monitored, as represented at block 288 and arrow 290. The front panel visually perceptible indicator LEDs 30–32 are powered from the main control function 260, as represented by arrow 292 and block 294. Finally, the control interface between power supply 10 and the user system is represented by dual arrow 296 extending to the main control function 260.

Figure 2:
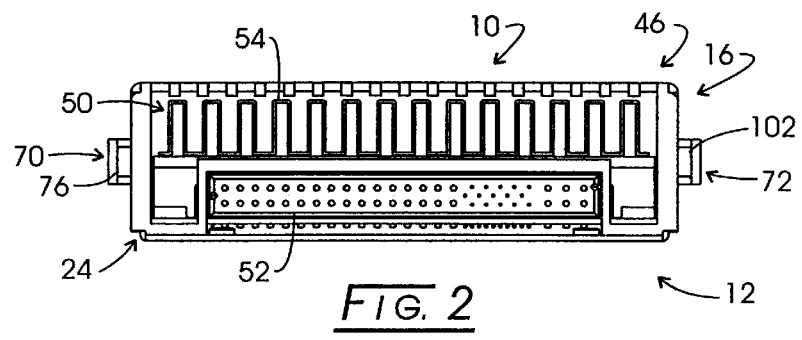
FIG. 2 is a rear view of the power supply of FIG. 1.
Figure 7B:
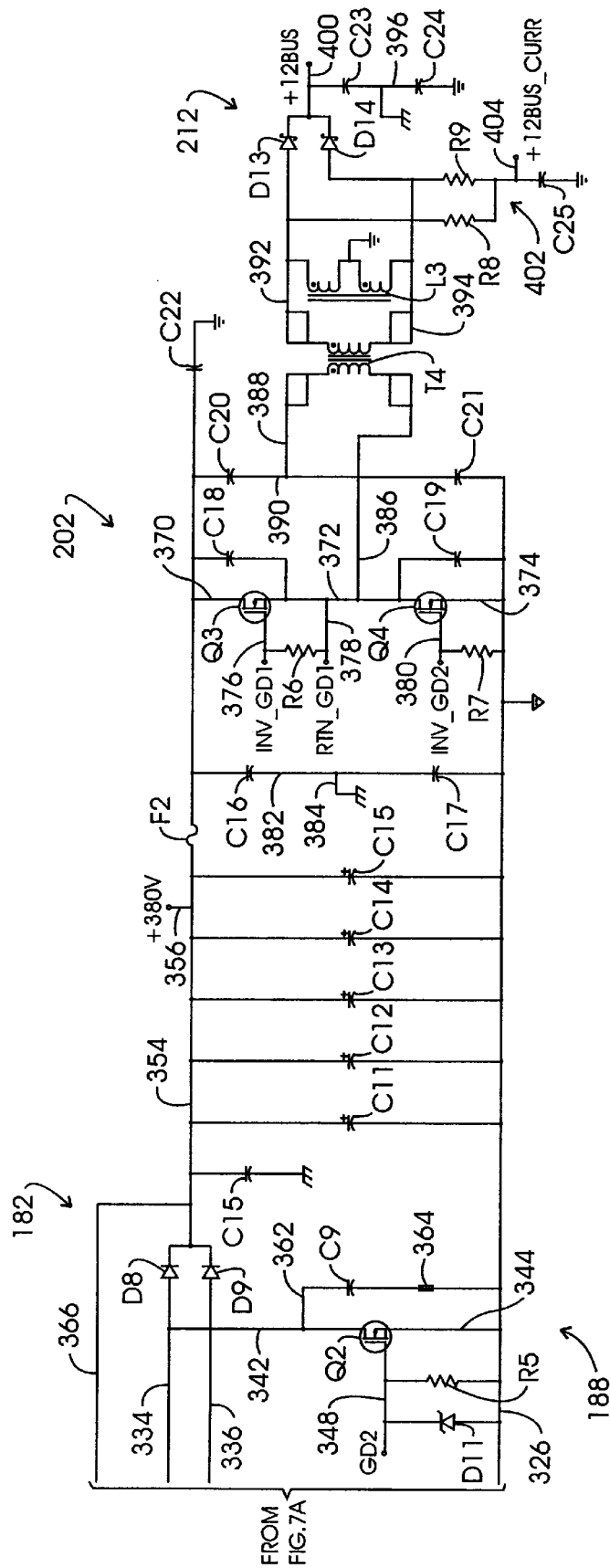

FIGS. 7A and 7B are associated in a side-by-side fashion in the manner labeled thereon and provide a next higher level of detail illustrating the circuit features of power supply 10. Looking to FIG. 7A, a three line a.c. input is connectable with the power supply 10 through three pin pairs at the connector 52 (FIG. 2). In this regard, line input (L1) is shown coupled to line 300; neutral (L2/N) is provided at line 302 and the ground (GND) is represented at line 306. A fuse, F1 is incorporated in line 300 whereupon EMI filtering and transient suppression components are encountered at the circuit region represented generally at 308. In this regard, a varistor 310 is connected between lines 300 and 302 and the filtering components are comprised of capacitors C1–C6 and transformers T1–T3. The filtered a.c. input, as now provided at lines 312 and 314, is tapped by small diodes D1 and D2 in respective lines 316 and 318 which extend to line 320 incorporating an isolating resistor R1. Diodes D1 and D2 constitute a half-wave rectifier which provides an a.c. sample (ACLINE) representing a control parameter utilized by the power factor control described at block 192 in FIG. 6. Lines 312 and 318 extend to a full-wave rectifier bridge 322 comprised of diodes D3–D6 which function to provide a d.c. input at lines 324 and 326 to the power factor correction converter described at block 188 in FIG. 6. Coupled within line 324, however, is an in-rush current limiter network represented generally at 328. Network 328 is comprised of a negative temperature coefficient thermister 330 across which a bypass circuit including relay activated switch S1 is provided. Switch S1 is activated to close and shunt the thermister 330 following an appropriate buildup of voltage level at holdup capacitors within the power supply 10 by energization of relay winding 332. A flyback diode D4 is seen coupled with the winding 332 which is energized from the primary circuit domain control power described in connection with arrow 198 in FIG. 6. Thermister 330 is employed for the instant application in view of its smaller size.

The a.c.-to-d.c. boost converter topology employed for power factor control, as represented generally at 188, uses two phases of switching for purposes of achieving a smoother development of high voltage d.c. at its output. Looking additionally to FIG. 7B, the boost converter 188 is seen to be comprised of MOSFET transistors Q1 and Q2. These transistors perform in conjunction with capacitor C7, inductors L1 and L2 and diodes D8 and D9. In general, the two transistors within network 188 perform in conjunction with what may be considered two separate circuit nodes. These two separate circuits switch in a 180° phase relationship which evokes a d.c. output with less ripple current and, consequently, less noise. Inductor L1 and diode D8 are seen coupled within line 334, while inductor L2 and diode D9 are coupled within line 336. The drain of transistor Q1 is coupled via line 338 to line 336, while its source is coupled by line 340 to line 326. Correspondingly, the drain of transistor Q2 is coupled via line 342 to line 334 and its source is coupled by line 344 to line 326. Transistors Q1 and Q2 perform under a control algorithm developed by the PFC control described in conjunction with block 192 in FIG. 6. In this regard, transistor Q1 is gated from line 346 with a gate control (GD1), while transistor Q2 is gated from line 348 by a gate control signal (GD2). In general, the a.c. voltage is supplied across capacitor C7 and into inductors L1 and L2 while transistors Q1 and Q2 are switched on and off appropriately under a control algorithm in order to maintain a signwave of current that is in phase with a signwave of voltage coming into the power supply 10. This control algorithm performs in conjunction with sense signals including the above-noted signal corresponding with incoming current identified at line 194 as "ACLINE". Additionally, a.c. current within the converter 188 is sensed at resistors R2 and R3 to provide an appropriate sense signal (ACI) at line 350. Corresponding a.c. voltage is sensed at line 352 extending from line 324 and identified as "ACV".

The output of the PFC network 188 will be a relatively high (e.g. 380 volts) voltage impressed across lines 354 and 326. That voltage is sensed for control purposes by a signal identified as "+380V at line 356. Zener diodes D10 and D11 limit the peak voltage at respective gating lines 346 and 348, while buffer resistors R4 and R5 further protect these transistors. Extending across transistor Q1 is a line 358 coupled between line 338 and line 326. Line 358 incorporates a capacitor C8 and ferrite bead 360 which is provided to bypass a current spike developed from the switching of inductor L2. The ferrite bead 360 is provided to dampen high frequency noise. In similar fashion, a line 362 extends across transistor Q2 between lines 342 and 326. Line 362 incorporates bypass capacitor C9 and a ferrite bead 364. Start-up d.c. voltage is directed via line 366 incorporating steering diode D12 which extends to line 354. A noise filtering capacitor C10 is coupled to line 354. Additionally, a series of large hold-up capacitors C11–C15 are coupled between lines 354 and 326. These capacitors provide both filtering and protection against short term anomalies in line power.

Line 354 extends through a fuse F2 to the zero voltage switching (ZVS) network 202. Fuse F2 functions to protect the incoming signal treatment circuitry from any short circuits which may occur in connection with network 202. Network 202 comprises two MOSFET power switching transistors Q3 and Q4. The drain of transistor Q3 is coupled by line 370 to line 354, while its source is coupled via line 372 to the drain of transistor Q4. The source of transistor Q4 is coupled by line 374 to ground line 326. Gate drive (INV_GD1, RTN_GD1) is provided to transistor Q3 at lines 376 and 378 interconnected through resistor R6. Similarly, gate drive (INV_GD2) is provided to transistor Q4 at line 380 which is interconnected through resistor R7 to line 326. Transistors Q3 and Q4 are configured in a half-bridge topology wherein the 380 volt d.c. input is split in half at capacitors C16 and C17 within line 382, the middle of which is coupled to ground at line 384. Control to transistors Q3 and Q4 is one which activates them alternately in 180° phase relationship. The alternating output is tapped at line 386 extending from line 372 to one side of the primary winding of a step-down transformer T4. The opposite side of that winding is coupled via line 388 to line 390. Thus, the primary winding of transformer T4 is impressed with an alternating 190 volt input. Capacitors C18 and C22 function as filters.

Transformer T4 steps down the impressed a.c. voltage, for example, in a 7:1 ratio, the secondary winding thereof providing an output at lines 392 and 394 which is filtered by a filtering or smoothing inductor L3. The circuit components which ensue now are within the secondary circuit domain. Pulsating current and voltage at lines 392 and 394 then is rectified at rectifier network 212 which is comprised of two Schottky diodes D13 and D14. Such diodes, which exhibit a very low forward voltage drop, are available for use in the circuit in view of the low voltage level within the secondary circuit domain. The rectified output is present at the earlier-described distribution bus line which, in the figures to follow is generally identified by the number 400, which is filtered, inter alia, at capacitors C23 and C24 within line 396.

With the arrangement shown, the power supply 10 has functioned to generate the 12 volt distribution bus 400 employing a very simple low cost but highly efficient zero voltage switching inverter. Inverter network 202 is not current limited nor is it's output regulated. However, the voltage level at distribution bus 400 remains essentially constant except in rarely occurring intervals of line drops and the like. That constant voltage value then permits a monitoring of instantaneous total system power utilization by sensing a signal corresponding with bus 400 current. Such a bus current signal will correspond with system power inasmuch as there is a linear relationship between voltage and current to develop power.

The a.c. signal at lines 392 and 394 is deemed to be a pulsating one, inasmuch as the a.c. current voltage is only positive-going. A d.c. current corresponding with the current at bus 400 is represented by the value of current passing within inductor L3. The current value can be extracted by carrying out an integration. Accordingly, a current detector network which includes an integrator network 402 is provided which is comprised of capacitor C25 along with resistors R8 and R9. Network 402 integrates the voltage developed by the resistance of the windings of inductor L3. A resultant current responsive signal (+12BUS_CURR) is then provided at line 404. The distribution bus 400 further is identified in the drawings as "+12BUS". Additional filtering of the distribution bus is provided by a sequence of 13 capacitors. These capacitors are revealed in FIG. 8 at C26–C38 coupled intermediate lines 405 and 406, the latter line being coupled to the distribution bus.

The configuration of components within housing 12 is one which, in general, provides a lower-disposed main circuit board or "motherboard" upon which are perpendicularly mounted a series of upstanding subsidiary circuit boards or "daughter boards". In FIGS. 9 through 14, these daughter boards are identified in conjunction with the inputs and outputs associated with them.

Looking to FIG. 9, the power factor correction control board earlier described in FIG. 6 at 192 is reproduced with its inputs and outputs. It may be recalled that this circuit board carries out two functions, that of providing a primary circuit domain auxiliary voltage, and the second function is that of supporting a power factor controller, which may be provided as a type LT1248 marketed by Linear Technology, Inc., of Milpitas Calif. For supporting the latter controller component, the sensed parameters as described in FIGS. 7A and & 7B are introduced, those parameters being: ACV, ACI, ACLINE, and +380V. Outputted from the circuit board 192 are the gate drives GD1 and GD2, as well as the 12 volt primary circuit domain control circuit voltage, +12PRI. The controller additionally performs with returns identified as RTN_PRI and RTN_GD. Lines 408 and 409 connect these terminals to ground.

FIG. 10 depicts the inverter control board 206 which performs in conjunction with the primary circuit domain auxiliary voltage, +12PRI, and incorporates a complimenting return identified as RTN_PRI coupled to ground at line 411. The gate drive controls, INV_GD1, RTN_GD1 and INV_GD2 also are provided from circuit board 206.

Figure 11:
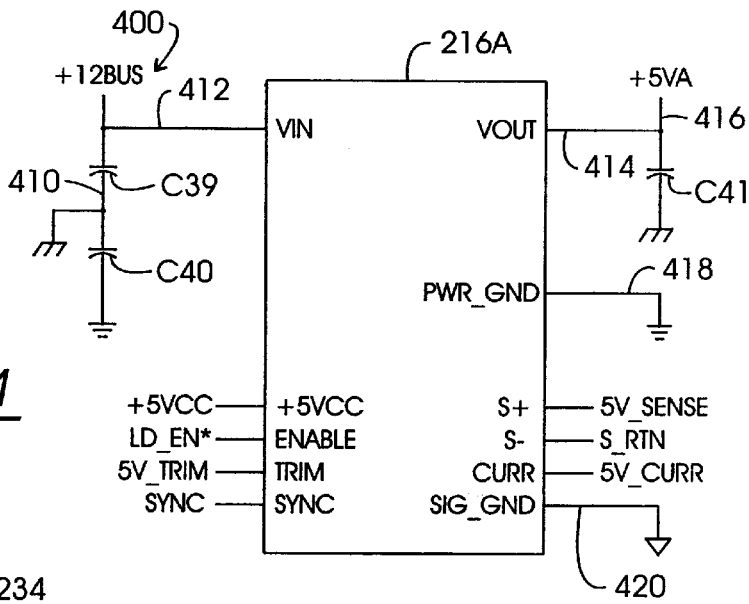
FIG. 11 is a block diagram of a daughter board according to the invention carrying a synchronous buck d.c.-to-d.c. converter circuit.

Looking to FIG. 11, a circuit board 216A is represented which corresponds with the synchronous buck d.c.-to-d.c. converter described in conjunction with block 216 in FIG. 6. Two such daughter boards, each supplying a regulated +5 volts with a 35 ampere rating are provided. These outputs then are combined to provide a singular output with a 70 ampere rating. By so limiting the current rating for each circuit board, the desired highly efficient and cost effective surface mounted circuit archetecture can be employed. In general, these two converters perform in conjunction with a type LTC1629 polyphase, high efficiency synchronous step-down (buck) switching regulator marketed by Linear Technology, Inc. (supra). The input to these boards (VIN) receives +12 volts (+12BUS) as represented at lines 410 and 412, the former carrying filter capacitors C39 and C40. The circuit performs in conjunction with a control voltage (+5VCC) and a corresponding ground (SIG_GND) at line 420 generated on a control daughter board. This circuit receives an externally generated synchronization signal (SYNC) and responds to an externally generated trim input (5V-TRIM) to adjust the regulated output. The circuit is enabled upon the occurrence of a logic low true input signal (LD_EN). A regulated output (VOUT) is shown at lines 414 and 416, the latter line incorporating a filter capacitor C41. The output (+5VA) is directed to the blocking diode function described earlier at symbol 220. Power ground (PWR_GND) is provided at line 418 and a signal corresponding with the monitored voltage output (5V_SENSE, S_RTN) provide feedback for control. Additionally, the current monitored value of the regulated output (5V_CURR) is inputted.

In similar fashion, two identical daughter boards providing the synchronous buck d.c.-to-d.c. converter function represented at block 226 are provided. As before, each such daughter board is configured to provide at a regulated 3.3 volt output with a 35 ampere rating, such outputs being joined together for introduction to the blocking diode function represented in FIG. 6 at symbol 230. Surface mount circuit topology is provided for each of these daughter boards, one of which is identified in FIG. 12 at 226A. The input (VIN) to the instant circuit is provided from the distribution bus (+12BUS) as represented at lines 422 and 424. Line 422 is seen to incorporate filtering capacitors C42 and C43. As noted above, because the converter performs with the distribution bus 400 input, it's operation is fully independent of the circuits of converter function 216. The circuit mounted upon daughter board 226A performs in conjunction with a control board generated control voltage (+5VCC) and signal ground (SIG_GRN) at line 426. The circuit responds to a synchronization input (SYNC) and to a trim input (3.3V_TRIM) and commences operation upon being enabled by a logic low true enable signal (L_DEN). The controller also responds to signals representing a monitoring of the regulated output voltage and current associated therewith as represented at inputs: 3.3V_SENSE, S_RTN, and 3.3V_CURR. A regulated output (+3.3VA) is seen presented at lines 428 and 430, the latter line incorporating filter capacitor C44. Power ground (PWR_GND) is coupled to ground as represented at line 432.

Figure 13:
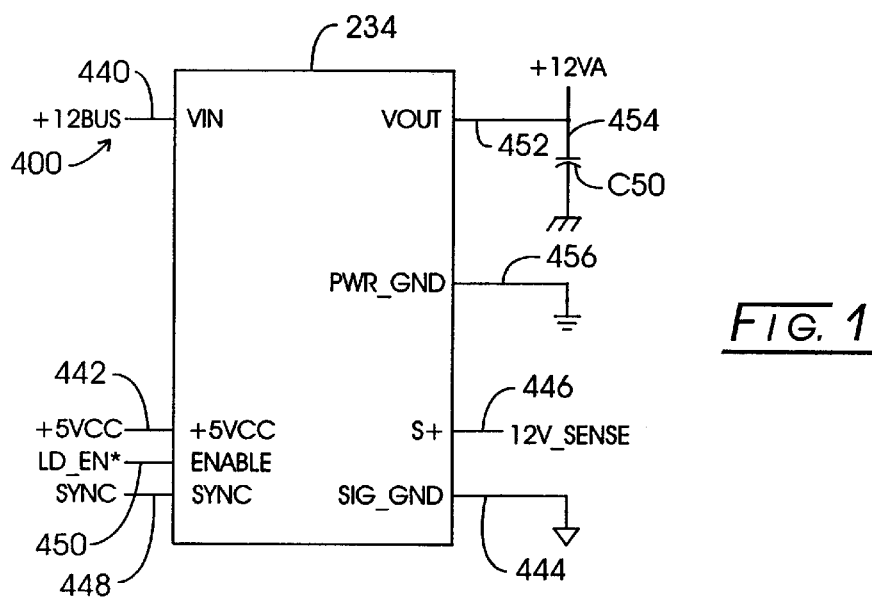
FIG. 13 is a block diagram of a daughter board carrying a buck-boost d.c.-to-d.c. converter employed with the power supply of the invention.
Figure 12:
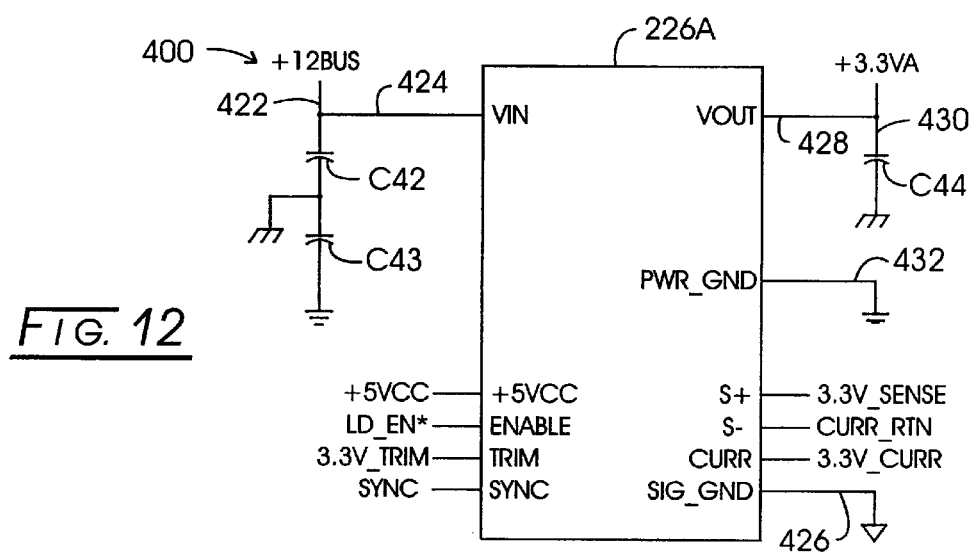
FIG. 12 is a block diagram of a daughter board carrying a synchronous buck d.c.-to-d.c. converter employed with the power supply of the invention.

FIG. 13 illustrates the daughter board carrying out the buck-boost d.c.-to-d.c. converter function described at block 234 which provides a +12 volt, 10 ampere regulated output. The circuit is configured with a surface mount architecture and performs, inter alia, with a dual-channel pulse-width-modulation (PWM) control circuit which may be provided as a type TL1454 marketed by Texas Instruments, Inc. of Dallas, Tex. Residing within the secondary circuit domain, the input (VIN) to the circuit 242 is from the 12 volt distribution bus (+12 BUS) as represented at line 440. Power for local control (+5VCC, SIG_GND) is represented at respective lines 442 and 444 and the regulated output monitoring signal (12V_SENSE) is introduced to the S+terminal at line 446. A synchronization (SYNC) input is provided at line 448 and the converter is enabled in response to a logic low true input (LD_EN) as represented at line 450. The output (VOUT) provides a regulated +12 volt (+12VA) at lines 452 and 454 in conjunction with power ground (PWR_GND) at line 456. A filtering capacitor C50 is incorporated within line 54.

Looking to FIG. 14, the main control board described at 260 is revealed. Main control board 260 principally is configured with surface mount circuit topology and will be seen to be incorporated as an elongate circuit board extending along one side of the interior cavity of housing 12.

Control board 260 carries circuitry providing a variety of functions including connections for interfacing with the system within which the power supply is mounted. In this regard, the interface connections are represented at line array 458 which extend ultimately to connector 52 (FIG. 2). These connections include: SIG_GND on signal ground; INHIBIT, an external signal turning off the power supply output; ENABLE, a signal enabling the operation of the power supply; +5 AUX/50MA, an auxiliary power supply used for control circuitry; FAIL, a power supply failure signal; DEG/OVTP, a high temperature signal indicating degradation in the sense that temperatures are rising toward a temperature shutdown; 5V_SHARE, a share input for multiple power supplies; 5VADJ, a voltage adjust input; 3.3V_SHARE, a share signal for multiple power supplies; and 3.3VADJ, a voltage adjustment input for the 3.3 volt regulated output.

The control board also supports the −12 volt regulated output described in FIG. 6 in connection with block 242. That output (−12VA) is represented at lines 460 and 462 in conjunction with corresponding power ground (PWR_GND) at lines 464 and 466. That ground also is present at lines 468 and 470. The circuitry carried by daughter board 260 is within the secondary circuit domain and receives power input from the distribution bus (+12BUS) at lines 472 and 474. The control circuitry carried by daughter board 260, in effect, responds to interface inputs developed from line array 458 and then controls the converters through the signal exchanges represented at line array 476. In this regard, the following signals are involved: LD_EN is a low logic true load enable signal which functions to turn on all of the converters; 5V_TRIM is a signal adjusting the output voltage of the 5 volt regulator function; 3.3V_TRIM adjusts the output voltage of the 3.3 volt regulator; +5VCC is a low auxiliary voltage utilized by the d.c.-to-d.c. converters; SYNC is a clock signal which synchronizes the d.c.-to-d.c. converters together, +5VA is the signal representing the sense output of the 5 volt regulator; 3.3VA is the signal wherein the output of the 3.3 volt regulator is sensed; +12VA is the monitoring signal representing the output of the +12 volt regulator; TEMP is the signal from a temperature sensor as represented at block 288 in FIG. 6; 12BUS_CURR is a sample of the current that is flowing in the distribution bus as described in connection with FIG. 7B; 5V_CURR is a current share output for the 5 volt regulator; 3.3 V_CURR is a current share output for causing the 3.3 volt regulator to share current; 5V_SENSE is a monitoring input for the current share function; and 3.3V_SENSE is a corresponding current share monitoring signal for the 3.3 volt regulator. Signal ground connection is represented at line 478.

Figure 15:
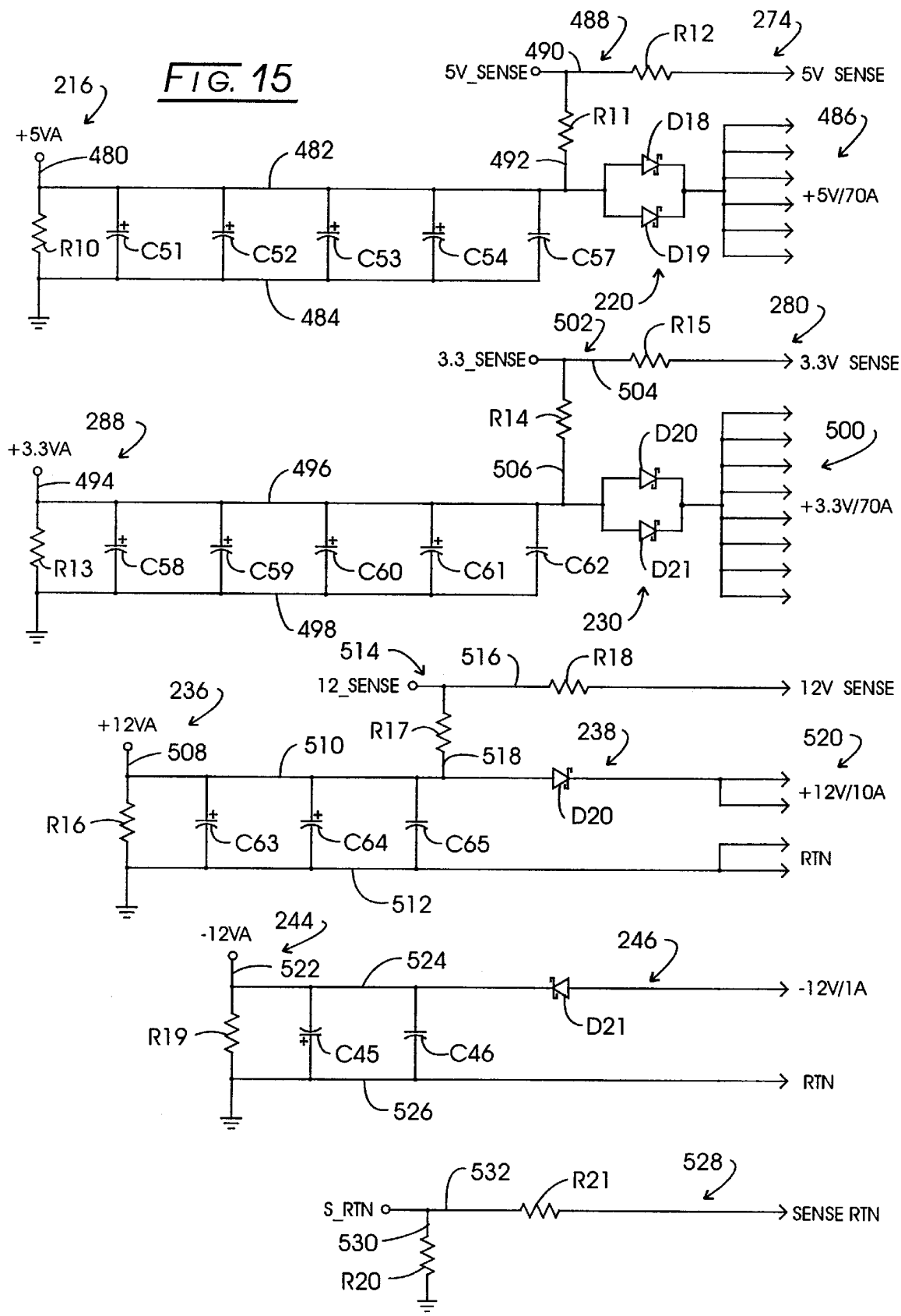
FIG. 15 is an electrical schematic diagram showing circuit components mounted upon the motherboard circuit board of the invention.

Referring to FIG. 15, circuitry carried, inter alia, by the noted motherboard functioning to treat the output of the regulating converters is revealed. In this regard, the regulated +5 volts (+5VA) earlier represented at line 218 is shown introduced at line 480 to be further filtered by an array of filtering capacitors C51–C57 extending between lines 482 and 484. A resistor is incorporated within line 480 between the regulated input and ground. Line 482 is directed to the earlier described blocking diode function 220 formed of two Schottky diodes D18 and D19 and thence to an array of output leads extending ultimately to connector output pins. A sensing network 488 including resistors R11 and R12 within respective lines 490 and 492 derives the current share function monitoring outputs. It may be recalled that two daughter boards, each having a 35 ampere rating are employed for this regulator function. The outputs of those daughter boards (+5VA) are connected in common at line 480. Diodes D18 and D19 are very high thermal or heat generators which are uniquely positioned within the housing 12 of the power supply 10.

In similar fashion, the outputs of the paired 3.3 volt regulators (+3.3VA) as earlier described at 228 are combined at line 494 and filtered by a capacitor network comprised of capacitors C58–C62 coupled between lines 496 and 498. A resistor R13 is positioned within line 494 between the regulated voltage input and ground. Line 496 is seen to be directed to the earlier described blocking function 230 now shown to be comprised of two diodes D20 and D21. Passing through those passive components, the output then extends to multiple lead array 500 which, in turn, is coupled with multi-pin connector 52. As before, diodes D20 and D21, while passive in nature are relatively high heat generators and, when considered in combination with the passive diodes D18 and D19 will generate about 70 watts of power dissipated as heat. The monitoring for current share functioning is developed at network 502 which is comprised of resistors R14 and R15 within respective lines 504 and 506.

The +12 volt output (+12VA) described at line 236 is shown applied to line 508, whereupon it is filtered by a network of filter capacitors C63–C65 coupled between lines 510 and 512. A resistor R16 is coupled within line 508 between the input and ground. The earlier described diode function 238 is shown implemented by singular diode D20. For current share purposes, the output is monitored by sensing network 514 comprised of resistors R17 and R18 and lines 516 and 518. The regulated output, as well as return is directed to a lead array 520 for presentation at pin connector assembly 52.

The regulated −12 volt output (−12VA) is derived from a circuit mounted upon the control board 260. That regulated output (−12VA) is seen directed to line 522 and is filtered by filter capacitors C64 and C65 coupled between lines 524 and 526. A resistor R19 is coupled within line 522 between the input and ground and the earlier described blocking diode function 246 is seen to be implemented by diode D21. Lines 524 and 526 are directed to connection with pin connector 52.

Return current also is sensed, such monitoring signal being developed by network 528 comprised of resistors R20 and R21 within respective lines 530 and 532.

Figure 16B:
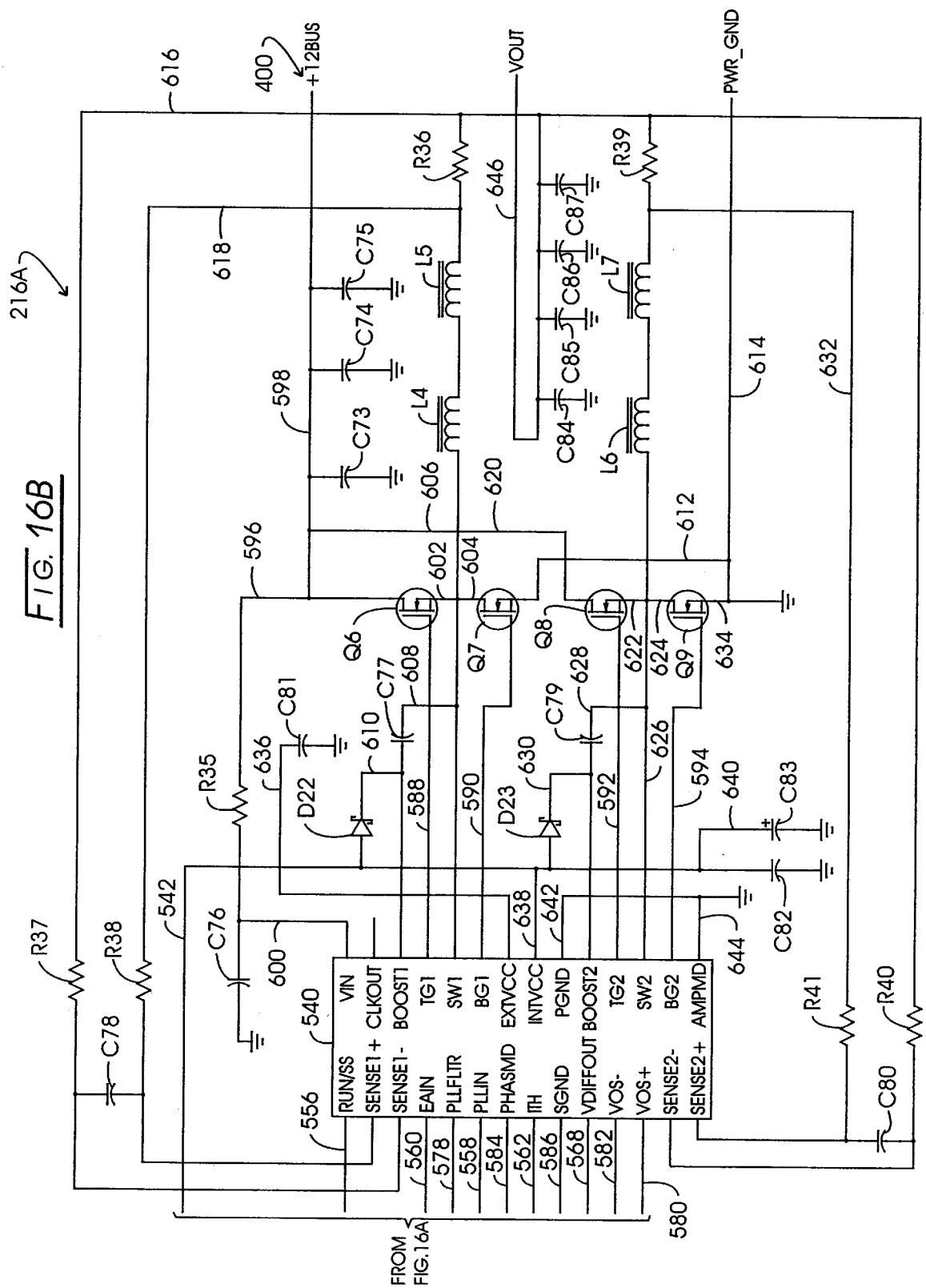

The four daughter boards supporting the d.c.-to-d.c. buck converters are structured essentially identically. It may be recalled that the outputs of each pair of 35 ampere rated converters are combined to provide a 70 ampere rated output at the regulated voltage. Because these converters are entirely within the secondary circuit domain, their circuit architecture is quite simple and is implemented with surface mount technology. An exemplar of these circuits, for example, implemented to provide a +5 volt regulated output at a 35 ampere rating, is illustrated in FIGS. 16A and 16B. Those figures should be mutually oriented in the manner labeled thereon. The daughter board 216A is represented in these figures. A corresponding daughter board, 216B (FIG. 22) will have its output paired with the output of this circuit. Operation of these synchronous buck converters is centered about a multiple phase, dual, synchronous step-down current mode switching regulator controller seen in FIG. 16B at 540. Controller 540 drives N-channel external power MOSFET stages in a phase-lockable fixed frequency architecture. The controller drives its two output stages out of phase at frequencies up to 300 kHz to minimize RMS ripple currents in both input and output capacitors. Such devices are marketed as the earlier-identified model LTC1629. Device 540 and the control circuit shown in the figures is powered from the +5VCC output of the control board 260 as represented at line 542. Looking to FIG. 16A, a line 544 extending from line 542, incorporates a gate resistor R22 and is coupled to gate signal input line 546. Line 546 is coupled with the gate of a transistor Q5 the source of which is coupled via line 548 to signal ground line 550. Line 550 carries the SG GND ground from the controller board 260. The drain of transistor Q5 is coupled to line 552 which, in turn, extends to line 554 extending between lines 542 and 550 and incorporating resistor R23 and capacitor C66. Line 554 is tapped by line 556 which, as shown in FIG. 16B is coupled to the run input of device 540. Returning to FIG. 16A, the enable signal LD_EN is logic low true, thus, transistor Q5 is normally on by virtue of gate drive asserted from line 544. When transistor Q5 is turned on, capacitor C66 is shunted to ground. However, with the presence of a logic low enable signal, transistor Q5 is turned off, a voltage level is derived at line 554 which is transmitted to device 540 by line 556. A synchronization signal (SYNC) derived from the control board 260 is provided at line 558 which is seen to extend to the PLLIN terminal of device 540. The trim input (5V_TRIM) is provided from the control board 260 at line 560 incorporating resistor R24 and extending to the EAIN terminal of device 540. Next, the 5 volt current sense signal from the control board 260 is provided at line 562 incorporating resistor R25 and directed to the ITH terminal of device 540.

Trim line 560 (5V-TRIM) is configured in conjunction with line 564 which extends through resistor R26 to signal ground line 550 and which is surmounted by filtering capacitor C67 within line 566. Line 564 additionally is tapped by line 568 which incorporates input resistor R27 and extends to the VDIFFOUT terminal of device 540. A filtering capacitor C68 is provided within line 570 extending, in turn, between lines 560 and 568.

Current signal line 562 (5V_CURR) is configured with resistor R28 within line 572 extending between line 564 and line 562. Additionally, the line is configured in conjunction with line 574 incorporating resistor R29 and capacitor C69. A capacitor C70 within line 576 extends about resistor R29.

Line 578 connects the PLLFLTR terminal of device 540 to signal ground. The line is seen to be filtered by capacitors C71 and C72 along with resistor R30. Monitored, regulated 5 volt sense signal (5V_SENSE) is seen coupled to the VOS+ terminal of device 540 via line 580, while the return (CURR_RET) is coupled via line 582 to the VOS− terminal. The PHASMD and SGND terminals are coupled to signal ground line 550 via lines 584 and 586.

Looking to FIG. 16B, device 540 is seen to function to provide appropriate gating waveforms to two MOSFET transistor pairs Q6, Q7 and Q8, Q9. In this regard, the gate of transistor Q6 is coupled by line 588 to the TG1 terminal and the gate of transistor Q7 is coupled by line 590 to the BG1 terminal of device 540. Similarly, the gate of transistor Q8 is coupled by line 592 to the TG2 and the gate of transistor Q9 is coupled by line 594 to the BG2 terminal of device 540. The drain of transistor Q6 is coupled via lines 596 and 598 to the distribution bus (+12BUS). Line 598 is seen to be filtered with capacitors C73–C75. Line 596 incorporates resistor R35 and capacitor C76 and extends ground. Connecting line 600 extends from a position intermediate those components to the VIN terminal of device 540. The source of transistor Q6 is coupled with line 602, while the drain of transistor Q7 is coupled with line 604 which is coupled in common with line 602 and with line 606. Line 606 extends to the SW1 terminal of device 540 and further is coupled with line 608 containing capacitor C77 and extending to the BOOST1 terminal of device 540. Additionally, line 608 is coupled through line 610, incorporating steering diode D22, which extends to line 542 carrying the +5VCC input. The source of transistor Q7 is coupled by line 612 to line 614 which, in turn, is coupled to power ground (PWR_GND).

Line 606 additionally is seen to extend to series coupled inductors L4 and L5 and incorporates a current sensing resistor R36. A signal corresponding with current across resistor R36 is provided at lines 616 and 618 incorporating respective resistors R37 and R38 that extend to respective terminals SENSE1− and SENSE1+ of device 540. A filtering capacitor C78 extends between line 616 and 618.

Looking to the second phase or node of operation, the drain of transistor Q8 is coupled by line 620 with line 598 which, in turn, carries the distribution bus 400 power supply (+12BUS). The source of transistor Q8 is coupled with line 622 and the drain of transistor Q9 is coupled with line 624, which lines are coupled in common with line 626 extending to the SW2 terminal of device 540. A line 628, incorporating capacitor C79, extends to the BOOST2 terminal of device 540 and is further connected by line 630, incorporating steering diode D23, to +5VCC carrying line 542.

Line 626 incorporates inductors L6 and L7 and extends through current sensing resistor R39 to line 616. Lines 616 and 632, incorporating respective resistors R40 and R4, extend to respective terminals SENSE2− and SENSE2+ of device 540. A capacitor, C80 extends between lines 616 and 632. The source of transistor Q9 extends via lines 634 to power ground at line 614.

The EXTVCC terminal of device 540 is coupled to line 636 which, in turn, extends to ground through capacitor C81. The INTVCC terminal of device 540 is coupled by line 638 to +5VCC carrying line 542. Line 542 and jointly connected line 640 incorporate respective capacitors C82 and C83 and extend ground. Ground is also connected to the PGND and AMPMD terminals of device 540 via respective lines 642 and 644. The output (VOUT) of the converter is provided at line 646 which is connected to line 616 and incorporates filtering capacitors C84–C87.

In operation, transistors Q6 and Q7 are gated 180° out of phase. Similarly, transistors Q8 and Q9 are gated 180° out of phase. Additionally, the combination of transistors Q6 and Q7 is 180° out of phase with respect to the combination of transistors Q8 and Q9. The result is a more ripple-free output at line 646.

Figure 17:
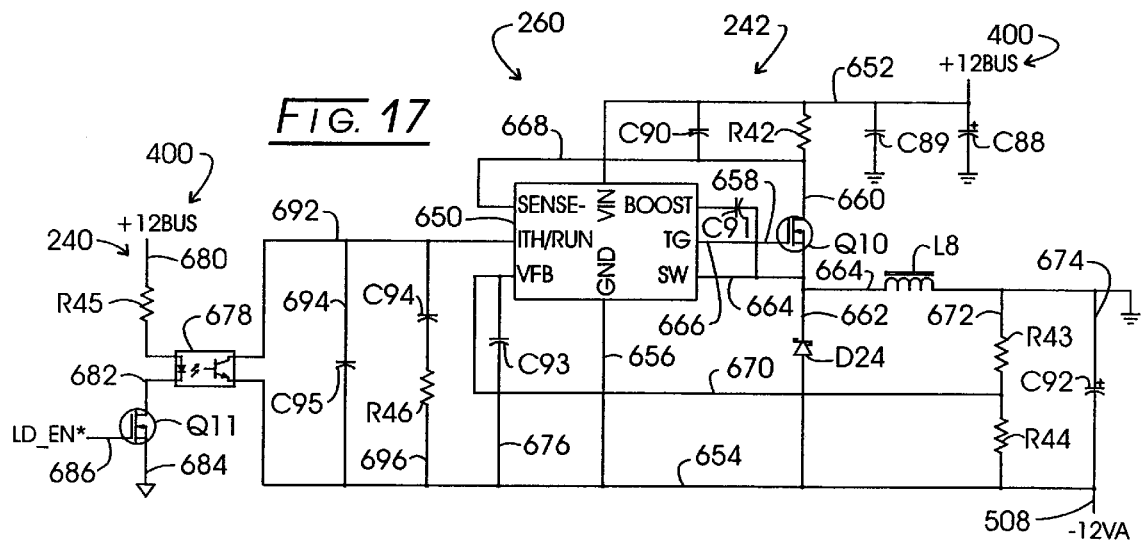
FIG. 17 is an electrical schematic diagram showing a buck-boost d.c.-to-d.c. converter employed with the power supply of the invention.

As noted in conjunction with FIG. 14, a number of circuit control functions are associated with the control board 260. Certain of the circuits that are mounted upon daughter board 260 are illustrated in connection with FIGS. 17 through 21. Looking additionally to FIG. 17, the buck-boost d.c.-to d.c. converter 242 generating −12 volts at low current is supported upon the control board 260. Circuit 260 performs in conjunction with a current mode switching regulator controller 650 which may be provided, for example, as a model LTC1624 marketed by Linear Technology Corp. (supra). Device 650 performs in conjunction with the distribution bus 400 (+12BUS) and is referenced to the −12 volt rail. In this regard, the +12 volts from the distribution bus at line 652 is introduced to the VIN terminal. Capacitors C88–C90 provide filtering and the ground input to device 650 is provided from −12 volt rail at line 654 and connecting line 656. The relatively simple circuit 242 operates in conventional buck-boost fashion, its TG terminal driving the gate of a power MOSFET transistor Q10 from line 658. The drain of transistor Q10 is coupled to the distribution bus at line 652 by line 660 incorporating resistor R42. The source of transistor Q10 is coupled to line 662 which incorporates free wheeling diode D24 and extends to the −12 volt rail at line 654. The inductor component of the converter is shown at L8 within line 654 extending between line 662 and ground. Line 652 also is coupled to the SW terminal of device 650 by line 664. That line also is coupled by line 666, incorporating capacitor C91 to the BOOST terminal of device 650. Line 660 is coupled to the SENSE− terminal of device 650 by line 668 and the VFB terminal is coupled by line 670 to a divider network comprised of resistors R43 and R44 within line 672 extending from line 664 to line 654. A filter capacitor C92 is seen positioned within line 674 extending between lines 664 and 654. Similarly, a filter capacitor C93 extends within line 676 from line 670 to line 654.

Because the user asserted load enable signal is at nominal control voltage with respect to ground and the circuit 242 is referenced to −12 volts, and opto-isolator 678 is provided to receive and convey an enable signal. The anode side of isolator 678 is coupled to the distribution bus 400 by line 680 incorporating resistor R45. The cathode side of device 678 is coupled by line 682 to the drain of transistor Q11, the source of which is coupled by line 684 to ground. Transistor Q11 is normally on and when the logic low true enable signal (LD_EN) is asserted at gate connected line 686, transistor Q11 is turned off to, develop an enable signal at line 692. Capacitor C94 and resistor R46 connected within line 690 between line 654 and line 692 provide feedback loop compensation. Line 692 extends from the collector of isolator 678 to the ITH/RUN terminal of device 650. That terminal is a multi-function one. A filter capacitor C95 is seen positioned within 694 which, in turn, extends between input lines 692 and line 654.

Figure 18:
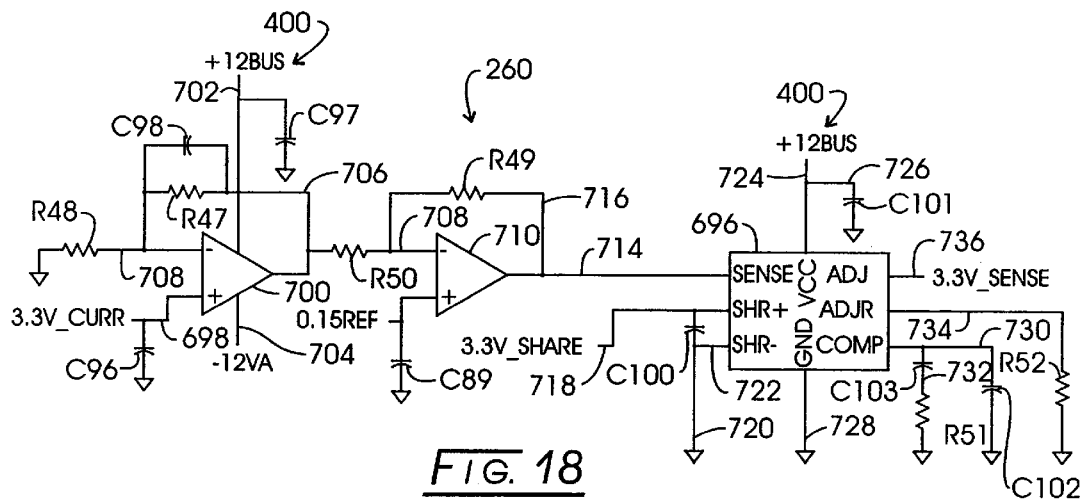
FIG. 18 is an electrical schematic diagram showing a share circuit employed with the power supply of the invention.

Also contained on the control board 260 are circuits which monitor the output currents of converters 216 and 226 (FIG. 6). These circuits, upon sensing the output current, buffer and amplify it and compare it to a common signal referred to generally as "SHARE". That control input is tied among all of the d.c.-to-d.c. converters which are providing the same regulated output voltage. This obtains even among different power supplies within a system. The comparison is made with respect to the average current of these common output converters. Where the comparison shows that a given converter is not equally sharing current, then the circuit provides correction. Referring to FIG. 18, one of these two circuits is revealed as it is associated with the regulated 3.3 volt output of converter 226 (FIG. 6). These circuits perform in conjunction with a load share controller as at 696 which, as noted, functions to balance the current drawn from independent, parallel power supplies. Output current is monitored and a signal (3.3V_CURR) corresponding with the level of that output current is introduced to the positive input terminal of an operational amplifier 700. Amplifier 700 is connected to the +12 volt distribution bus 400 via line 702 and to the −12 volt regulated output via line 704. A filter capacitor C97 is coupled between line 702 and ground. Device 700 is configured as a buffer by output line 706, input line 708, resistors R47 and R48 and capacitor C98. The buffered output at line 706 is directed by line 708 to the negative input of an operational amplifier 710. The positive terminal of amplifier 710 is coupled to line 712 which extends through capacitor C99 to ground and receives a 0.15 volt reference (0.15REF) which is developed by a divider circuit (not shown) mounted upon the control board. The output of this amplification stage is at line 714 and the stage is configured in conjunction with resistor R49 within feedback line 716 and resistor R50 within input line 708. The output of this amplification stage extends at line 714 to the SENSE input of controller 696. Device 696 receives a system share signal (3.3V SHARE) at line 718 which represents a system current average. Line 720 incorporating capacitor C100 extends to ground from line 718 and a line 722 extends from line 720 to the SHR− terminal of device 696. The VCC input to device 696 is from the 12 volt distribution bus 400 as provided from line 724 which is filtered by capacitor C101 within line 726. The ground terminal (GND) is coupled to ground via line 728 and the COMP terminal is configured in conjunction with lines 730 and 732 incorporating capacitors C102 and C103 and resistor R51 and extending to ground. Adjust return (ADJR) terminal of device 696 is coupled by line 734, incorporating resistor R52 to ground. The share adjusting output terminal (ADJ) provides the earlier noted 3.3V_SENSE at line 736. This adjustment output is delivered to the controller of the d.c.-to-d.c. converter and corresponds, for example, with the 5V_SENSE input at line 580 described in conjunction with FIG. 16A. Device 696 may be provide, for example, as a type UC3902 Load Share Controller, marketed by Unitrade Corp of Merrimack, N.H.

Control board 260 also supports two amplification circuits which receive an initial reference voltage referred to as "3.3V_ADJ" and "5V_ADJ" from the system user. This sets up the initial output voltage.

Figure 19:
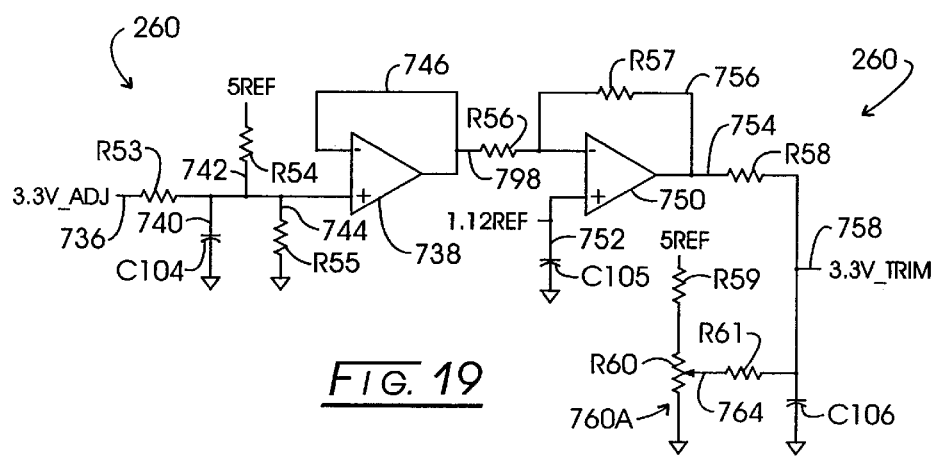
FIG. 19 is an electrical schematic diagram showing a trim circuit employed with the power supply of the invention.

Looking to FIG. 19 the circuit receiving the 3.3V_ADJ signal is shown having an input at line 736 which incorporates resistor R53 and extends to the positive input of operational amplifier 738. A filter capacitor C104 extends within line 740 to ground from line 736 and the line is coupled by line 742, incorporating resistor R54, to a 5 volt reference (5REF) which also is developed on the control board. A resistor R55 within line 744 extends to ground from line 736. The output and feedback for device 738 is provided at line 746 such that it serves a buffering function. Line 746 is coupled with line 748 extending to the negative terminal of operational amplifier 750. The positive terminal of that device is connected with line 752 extending to ground and incorporating capacitor C105. Line 752 also receives a 1.12 volt reference input (1.12REF) derived from a divider circuit (not shown) carried by control board 260. The output of device 750 is provided at line 754 and is configured with feedback line 756, resistors R56 and R57 to provide an amplified output. That output at line 754 extends through resistor R58 to provide a trim signal (3.3V_TRIM) at line 758. This output corresponds, for example, with the earlier described 5V_TRIM asserted at line 560, as discussed in connection with FIG. 16A. The converter outputs also can be manually trimmed with a potentiometer represented at network 760, comprised of resistors R59 and R60 within line 762 extending between a 5 volt reference (5REF) and ground which is operationally associated with a wiper arm incorporating a resistor R61 and coupled with line 754. A capacitor C106 is seen positioned within line 754 below line 764.

The control board also incorporates a sequence of monitor/comparative functions which serve to communicate a variety of circuit related conditions to the user associated system. This function also serves to selectively energize LEDs 30–32 described in connection with FIG. 1.

Figure 20A:
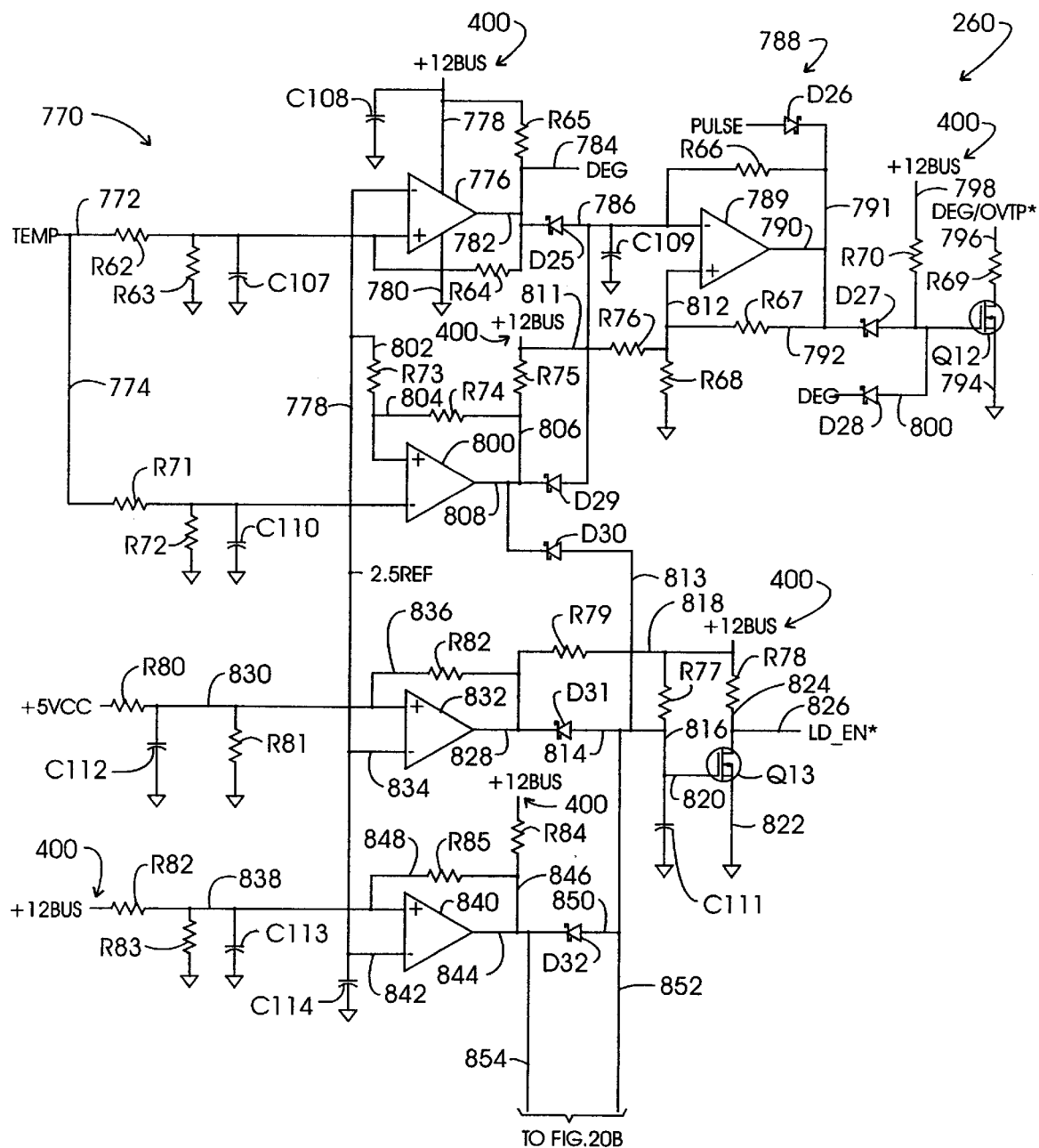
FIGS. 20A and 20B combine as labeled thereon to provide an electrical schematic diagram carrying out monitoring and control functions of the power supply of the invention.
Figure 20B:
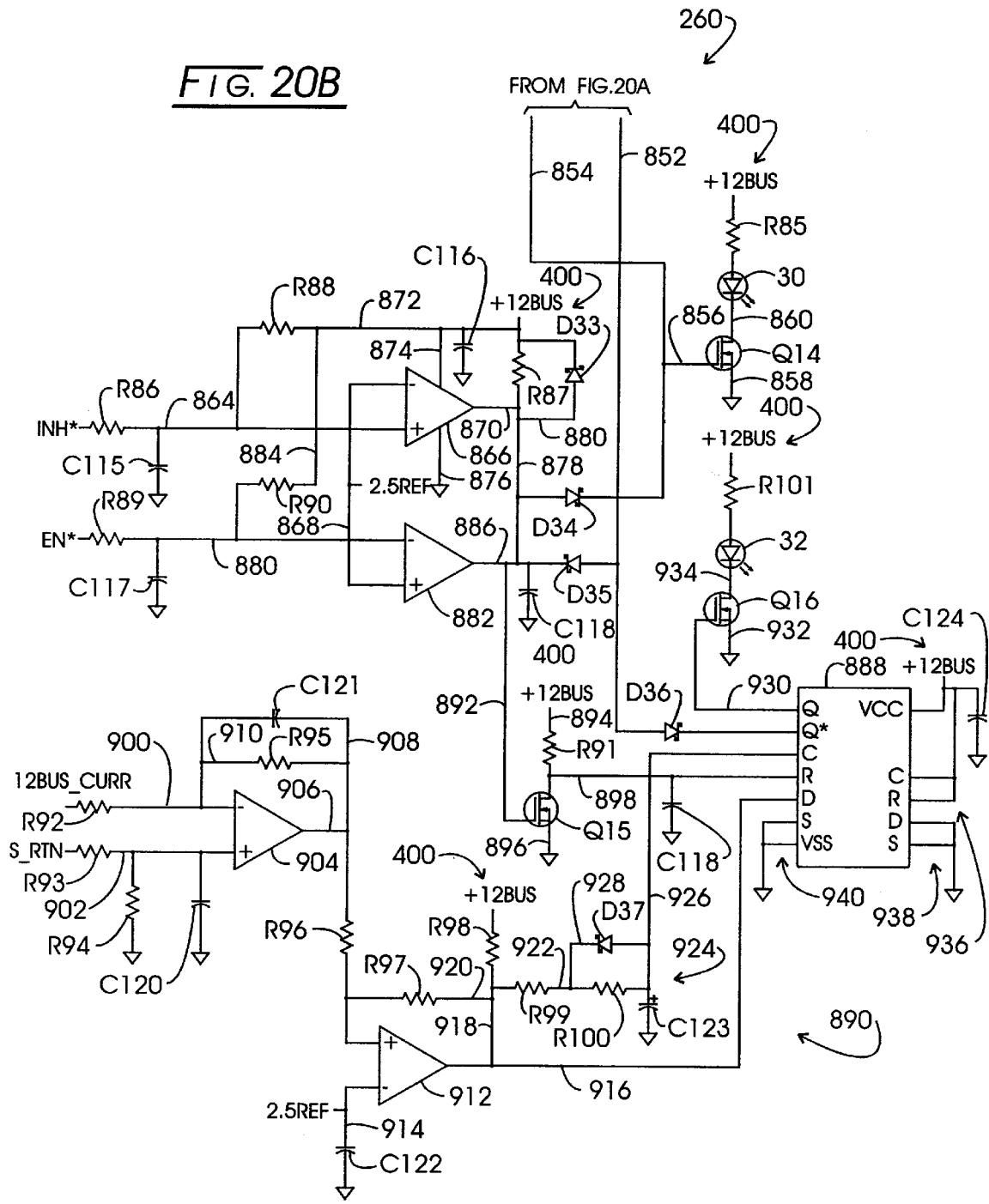

Referring to FIG. 20A a network configured for monitoring temperature within the housing 12 is represented generally at 770. Network 770 responds to a temperature responsive voltage level developed by a sensor positioned within the forward region of chassis 12. The sensor may be provided, for example, as an integrated circuit temperature sensor which operates, in effect, as a two-terminal zener diode. Such a device is sold, for example, as a type LM335A marketed by National SemiConductor Corporation of Santa Clara, Calif. The temperature signal is introduced at lines 772 and 774. Line 772 incorporates resistor R62 and extends to the positive input terminal of a comparator 776. Filtering to line 772 is provided by resistor R63 and capacitor C107 extending therefrom to ground. The opposite input to comparator 776 is a 2.5 volt reference (2.5REF) at line 778. That reference is generated by a small reference developing network (not shown) on the control board 260. Comparator 776 is coupled to the distribution bus 400 at line 778 and to ground at line 780 and is configured with resistors R64, R65 and capacitor C108 such that its output at line 782 remains at a logic low level when the sensed temperature is 80° C. or less. The output at line 782 also represents a degrade (DEG) signal represented at line 784. Line 782 extends further to line 786, incorporating a diode D25, and extending to an oscillator network represented generally at 788. Network 788 is formed with an operational amplifier 790 which is configured in conjunction with resistors R66–R68 and capacitor C109. A resulting pulsed output is provided at lines 790–792. Line 791 incorporates a diode D26 the anode side of which is identified as carrying a "PULSE" signal. Line 792 incorporates a diode D27 and extends to the gate of transistor Q12. The source of transistor Q12 is coupled via line 794 to ground and the drain thereof is coupled to line 796 incorporating resistor R69. When the network 788 is activated, line 796 produces a degradation signal related to over temperature (DEG/OVTP) which is made available to the user system. Line 792 additionally is coupled to line 798 incorporating resistor R70 and coupled with the distribution bus 400. Accordingly, transistor Q12 is turned on in an alternating fashion with the activation of network 788. A line 800 containing diode D28 evolves another degradation signal. Network 788 is activated with the resultant intermittent turning on of transistor Q12 when the output at line 782 of comparator 776 assumes a logic high condition, back biasing diode D25 and enabling or unclamping capacitor C109.

Returning to line 774, the temperature related signal is directed within that line through resistor R71 to the negative input of a comparator 800. Line 774 is filtered by resistor R72 and capacitor C110 coupled therefrom to ground. The positive terminal input to comparator 800 is developed from lines 778, 802 and 804, the latter lines incorporating respective resistors R73 and R74. Line 804 extends to line 806 which extends between the output of comparator 800 at line 808 to the distribution bus 400. Line 806 further incorporates resistor R75. Output line 808 extends to diode D29, the anode of which is coupled via line 810 to the anode side of diode D25. Thus, a logic low value at line 808 resulting from a temperature value of 95 or greater clamps capacitor C109 at a low logic value to disable oscillator network 788. The distribution bus 400 voltage level is seen extending via line 811, resistor R76, line 812 and resistor R67 to the cathode of diode D27. That diode is back biased to permit a steady state gate drive to transistor Q12 from line 798. The ultimate result is a fault condition wherein the entire power supply 10 is shut down.

In the latter regard, the logic low condition at line 808 functions to draw a diode D30 within line 813 into conduction. Line 813 is at a logic low value and is seen to extend to line 814. Line 814, in turn, extends to line 816 incorporating capacitor C111 and resistor R77 and coupled between ground and the distribution bus 400 at line 818. Line 816 is coupled to line 820 which extends to the gate of transistor Q13. The source of transistor Q13 is coupled to ground via line 822, while its drain is coupled via line 824 with the distribution bus 400 at line 818. Line 824 incorporates a resistor R78. Note additionally, that the enable signal, LD_EN is coupled with line 824, as represented at line 826, and that the distribution bus 400 at line 818 extends through a resistor R79 to line 828 at the cathode side of a diode D31. Thus, in the absence of a logic low condition at line 828, diode D31 is back biased and with the absence of a logic low value at line 812, transistor Q13 is turned off to change the active low enable signal at line 826 to an inactive logic high condition. That signal, when at a logic low level, enables all of the d.c.-to-d.c. converters, including that described in connection with FIG. 17. Thus, upon the condition of a sensed temperature above 95° centigrade, the regulating converters are inhibited.

Auxiliary voltage, 5VCC also is monitored at line 830 incorporating resistor R80 and extending to the positive terminal of a comparator 832. Line 830 is filtered by capacitor C112 and resistor R81 extending therefrom to ground. The negative terminal of comparator 832 is coupled with reference line 778 by line 834 and the device is configured with resistor R82 which is incorporated within feedback line 836 extending from output line 828 to input line 830. With the arrangement shown, when the 5VCC input drops below a predetermined threshold, comparator 832 provides a logic high output at line 828 which back biases diode D31, again permitting transistor Q13 to turn on and thus remove the logic low true load enable signal at line 826 and throughout the power supply.

A similar circuit logic obtains in connection with the monitoring of the voltage level at the distribution bus. For example, when that level falls below about 7 volts, transistor Q13 will be caused to turn off and thus remove the logic low enabling signal at line 826. The distribution bus 400 is seen to be monitored at line 838 incorporating resistor R82 and extending to the positive input terminal of a comparator 840. Line 838 is filtered by resistor R83 and capacitor 113 extending therefrom to ground. Reference line 778 is seen to be filtered by capacitor C114 and its voltage level is applied to the negative terminal of comparator 840 from line 842. The output of device 840 at line 844 is connected by line 846 and incorporated resistor R84 to the distribution bus 400 (+12BUS). Line 846 also is coupled with feedback line 848 incorporating resistor R85 and extending to input line 838. The cathode of a diode D32 is coupled to line 844 and its anode is coupled by lines 850 and 852 to line 814. When the distribution bus 400 voltage level is at acceptable levels, then the output of comparator 840 at line 844 will be at a logic high value back-biasing diode D32 and permitting the gating of transistor Q13 into conduction to provide a logic low level at line 826 enabling the inverters within the secondary circuit domain. However, when the +12BUS signal drops below a predetermined threshold, output line 844 assumes a logic low condition permitting the forward biasing of diode D32 and the turning off of transistor 213, to in turn, cause line 826 to assume a logic high value effecting the disablement of the noted converters.

Under the logic of the instant circuit, as long as the distribution bus 400 voltage is within specification, i.e., above about 7 volts, then the assumption is made that the line input and primary circuit domain are performing properly. As a consequence, LED30 will be energized. Looking additionally to FIG. 20B, it may be noted that a line 854 extends from output line 844 of comparator 840 to line 856 which, in turn, is coupled with the gate of transistor Q14. The source of transistor Q14 is coupled to ground via line 856, while its drain is coupled with line 858 which incorporates LED30, resistor R85 and is connected to the distribution bus 400 (+12BUS). Accordingly, as long as line 854 remains at a logic high condition representing adequate voltage at the distribution bus, the green LED 30 is energized indicating that the input is ok. Conversely, where the voltage at the distribution bus 400 falls below a predetermined threshold, then line 854 assumes a logic low condition turning off transistor Q14 and de-energizing LED30.

The system user may provide either an enable or inhibit input to activate or deactivate the d.c.-to-d.c. converters within the secondary circuit domain. The logic low true inhibit signal (INH) is applied at line 84 which incorporates input resistor R86 and extends to the positive input of a comparator 866. Input to the negative terminal of comparator 866 is provided at line 868 which carries the reference voltage earlier noted in connection with line 778 (2.5REF). The output of comparator 866 is provided at line 870. Comparator 866 is coupled with the distribution bus 400 (+12BUS) by line 874 and to ground by line 876. Note, additionally, that the distribution bus 400 voltage is applied by line 872 incorporating resistor R88 to line 864. Thus line 864 is normally at a logic high level, while output line 870 is, without the presence of an inhibit input, at a logic low level. Note that output line 870 is coupled with line 878 which incorporates a timing resistor R87 and is coupled to the distribution bus 400 voltage at line 872. A discharge diode D33 within line 870 surmounts resistor R87. Line 864 is filtered by capacitor C115 extending therefrom to ground and line 872 also is filtered by capacitor C116 extending therefrom to ground. Line 878 extends to line 854 which incorporates a steering diode D34. Thus, a normally logic low value at line 870 will have no effect upon line 854 nor load enable control transistor Q13 (FIG. 20A). However, with the presence of a logic low true signal at line 864, output line 870 will assume a logic high level which is transmitted through steering diode D34 and the line 854 to turn off transistor Q13. Note that transistor Q14 remains on to continue the energization of LED30.

The user generated enable signal works in compliment with the above-described inhibit network A logic low level true enable Input may be applied to line 880 incorporating a resistor R89. Line 880 extends to the negative input terminal of a comparator 882 and the positive terminal receives a reference voltage from line 868. Distribution bus voltage is applied from lines 872 and 884 incorporating resistor R90. A filter capacitor C117 is located between line 880 and ground. With the imposition of a normal high logic level at line 880, the normal condition of output line 886 is a logic low level. Line 886 incorporates a steering diode D35 and is coupled to line 852. This logic low level, when applied to the latter line, will turn off transistor Q13 and remove the load enable signal at line 826 (FIG. 20A). Line 886 is connected with a timing capacitor C118 extending therefrom to ground. Resistor R87 and capacitor C118 provide an R-C network developing a form of soft start in presenting a logic high level signal to line 854.

The presence of a logic high level at output line 886 with the Imposition of a logic low active enable input line 880 will have no influence at line 852. It may be observed that line 852 incorporates a diode D36 which extends to a Q* terminal of a latch 888 which is a component of a power limit network represented generally at 890. It further may be observed that diodes D30, D31, D32, D35 and D36 are inter-associated in a wired OR circuit.

Output line 886 additionally is connected by line 892 to the gate of transistor Q15. The drain of transistor Q15 Is coupled via line 894 incorporating resistor R91 to the distribution bus 400 (+12BUS), while its source is coupled to ground by line 896. Line 894, additionally, is coupled by line 898 to the R terminal of latch 888. Line 898 is filtered by capacitor C119 extending between the line and ground.

The distribution bus 400 current monitoring signals as discussed in connection with FIG. 7B (+12BUS_CURR, S_RTN) are introduced to limit network 890 at respective lines 900 and 902. Limit network 890 functions with integrator network 402 to provide a current detector network. Lines 900 and 902 incorporate respective input resistors R92 and R93. Line 902 is coupled to ground through resistor R94 and is filtered at capacitor C120 coupled between the line and ground. Line 900 extends to the negative terminal input of an operational amplifier 904, while line 902 extends to its positive terminal. Amplifier 904 provides an output at line 906 and the device is configured as a buffer with feedback capacitor C121 within feedback line 908 and with resistor R95 within line 910.

The buffered output at line 908 extends through resistor R96 to the positive input terminal of a comparator 912. The negative terminal of device 912 is coupled via line 914 to reference voltage (2.5REF) representing a comparison signal the line incorporating a filtering capacitor C122 and extending to ground. The output of comparator 912 at line 916 will exhibit a logic high level in the presence of a sensed bus 400 current which is above a predetermined threshold. That logic high is directed to the data, D terminal of latch 888. Comparator 912 is configured in conjunction with line 918 extending from line 916 through resistor R98 to the distribution bus 400 (+12BUS). It is configured in conjunction with resistor R97 within a line 920 extending between lines 918 and 908. Line 918 additionally is coupled by line 922 and resistor R99 to an R-C network represented generally at 924 comprised of resistor R100 and capacitor C123 positioned within line 926. The discharge line 928 incorporating steering diode D37 is coupled between lines 926 and 922. R-C network 924 is one exhibiting a relatively large time constant, for example, 10 seconds. When output line 916 is at a normally low logic level, capacitor C123 remains discharged. However when line 916 transitions to a logic high level representing a power limit condition or signal, then capacitor C123 commences to be charged through resistor 100. Line 926 is coupled with the clock (C) terminal of latch 888. At the termination of the time-out of network 924, the fault condition at line 916 is responded to by terminal Q* assuming a logic low condition which is then present at line 852 which, in turn, functions to turn off transistor 213 (FIG. 20A) and remove the load enable signals to the secondary circuit domain. When terminal Q* transitions to a logic low level, terminal Q transitions to a logic high level. The latter terminal is coupled by line 930 to the gate of transistor Q16. The source of transistor Q16 is coupled by line 932 to ground, while its drain is coupled with line 934 to the distribution bus 400 (+12BUS) and incorporates the power limit diode D32 and resistor R101. Thus, as latch 888 functions to turn off transistor Q13 to, in turn, turn off the converters within the secondary circuit domain, LED32 is energized. When the logic high level occurring at line 916 is removed, then capacitor C123 is rapidly discharged through diode D37. The VCC, C, and R terminals of device 888 are coupled with the distribution bus 400 (+12BUS) at line array 936 which is filtered by capacitor C124. Network 924 serves to delay any shut-down of the power supply 10. This avoids unwanted stoppages which would otherwise occur in the event of spurious line anomalies of relatively short duration. The D and S terminals of device 888 are connected by line array 938 to ground and the S and VSS terminals are coupled to ground by line array 940.

Figure 21:
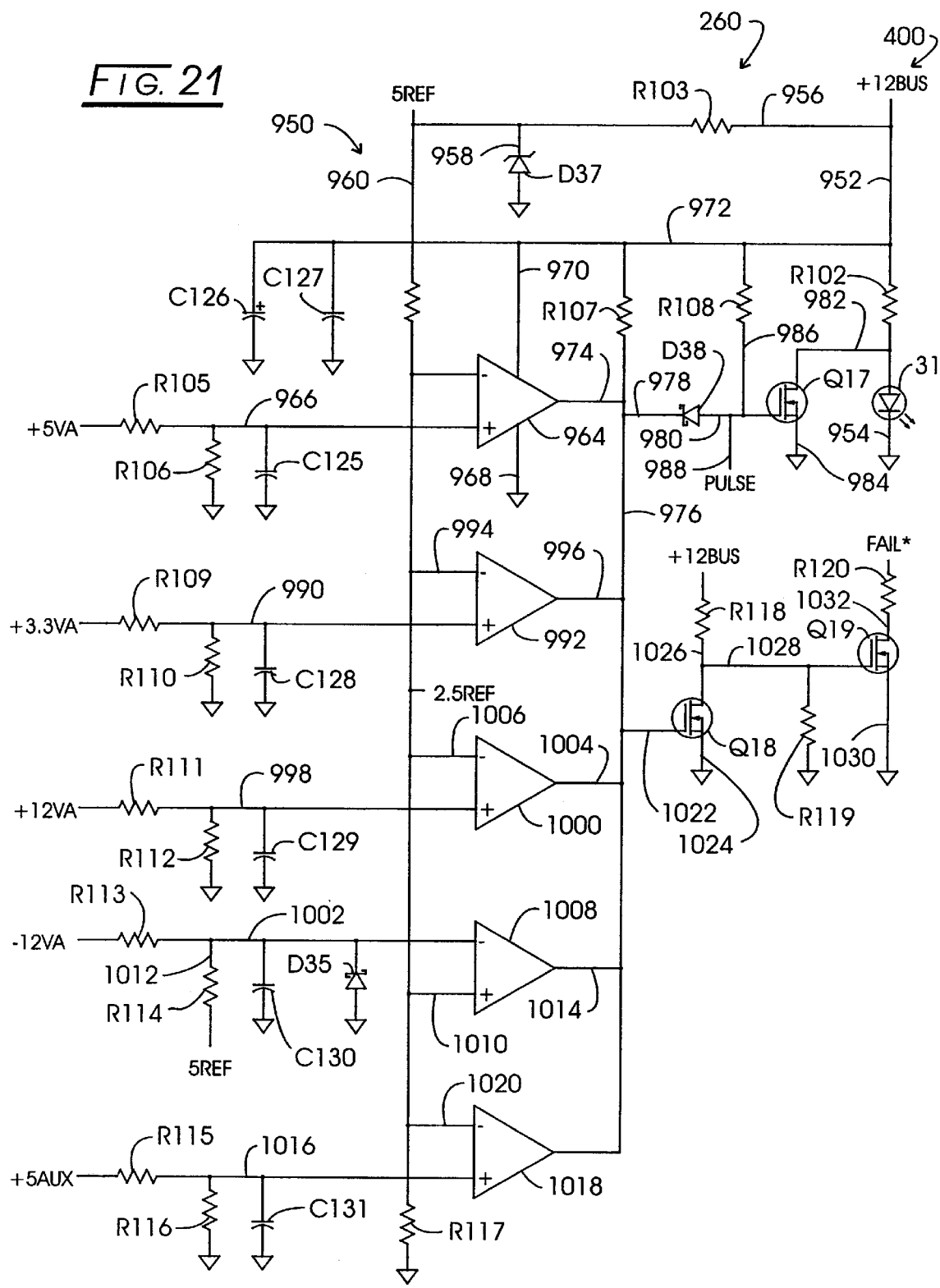
FIG. 21 is an electrical schematic diagram illustrating additional monitoring and control features of the power supply of the invention.

Referring to FIG. 21, a multistage comparator network represented generally at 950 is revealed. Network 950 also is mounted upon control board 260 and functions to monitor the output voltages of all converters within the secondary circuit domain and, additionally, a 5 volt, low current auxiliary output generated upon the control board. The latter auxiliary output is a utilitarian one provided for the system user. The network 950 is coupled with the distribution bus 400 (+12BUS) as shown at line 852 which incorporates resistor R102 and extends to the anode of LED31. The cathode of LED31 is coupled by line 954 to ground. It may be recalled that LED31 is energized to show a fault condition. This fault condition is generated when any of the comparators of network 950 senses, for example, a 20% voltage drop. Line 952 additionally is coupled to line 958 extending to ground and incorporating voltage limiting zener diode D37. Line 956 extends to line 960 which, in turn, is connected to a 5 volt reference (5REF) line 960. Line 960 incorporates resistor R104 and, in turn, is coupled via line 962 to the negative terminal of a comparator 964. The voltage output of the converter assembly 216 (+5VA) is provided at line 966 incorporating resistor 105 and extending to the positive terminal of comparator 964. A resistor R106 is coupled between line 966 and ground as is a capacitor C125. Comparator 964 is coupled to ground by line 968 and to the distribution bus 400 at line 952 via lines 970 and 972. The latter line is filtered by capacitors C126 and C127 located between that line and ground. The output of comparator 964 at line 974 is coupled to network 950 output line 976 which incorporates pull-up resistor R107 and extends to line 972. Line 976 is coupled by line 978 to the cathode of diode D38, the anode of which is coupled by line 980 to the gate of transistor Q17. The drain of transistor Q17 is coupled by line 982 to line 952 above the anode of LED31 and its drain is coupled to ground by line 984. Line 986 extending between line 980 and line 972 incorporates a pull-up resistor R108. With the arrangement shown, transistor Q17 is normally on to shunt and maintain the de-energization of LED31. However, where the signal at line 966 falls below the reference at line 962, output line 974 assumes a logic low value to remove the gate drive at transistor Q17 through diode D38. LED31 then is energized in a steady state fashion. It may be noted that the pulse output of oscillator 788 (PULSE) described in connection with FIG. 20A is asserted at line 988. Accordingly, in the presence of a degradation due to temperature signal (DEG/OVTP) transistor Q17 will be caused to turn off and on in a pulsating manner to energize fault LED31 in the same fashion.

The output of converter function 226 (+3.3VA) is introduced to line 990 incorporating input resistor R109 and extending to the positive input of a comparator 992. A 2.5 volt reference (2.5REF) is now asserted from line 960 via line 994 to the negative input to comparator 992. Comparator 992 provides an output at line 996 which is coupled to line 976. In the event of a voltage drop below threshold as witnessed at line 990, the output line 996 will assume a logic low value to, in turn, remove the gate input to transistor 217 through diode D38. LED31 then is energized in a steady state fashion. A resistor R10 is coupled between line 990 and ground as is a capacitor C128.

The +12 volt (+12VA) output of converter assembly 234 (FIG. 6) is submitted to line 998 incorporating input resistor R111 to the positive input terminal of comparator 1000. The negative terminal input to device 1000 is provided as the 2.5REF reference presented from lines 960 and 1002. A resistor R112 and a capacitor C129 are coupled between line 998 and ground. The output of comparator 1000 at line 1004 is coupled to line 976. Accordingly, when the monitored voltage drops below a predetermined threshold, line 1004 and line 976 assume a low logic level to turn off transistor Q17 and illuminate fault LED31 in a steady state fashion.

The −12 volt (−12VA) output of converter assembly 242 (FIG. 6) is submitted to line 1006, incorporating input resistor R115, which extends to the negative input terminal of comparator 1008. The positive input terminal of comparator 1008 receives the noted 2.5 volt reference from lines 960 and 1010. A line 1012 containing resistor R114 is coupled with the noted 5 volt reference (5REF). Capacitor C130 is coupled between line 1000 and ground and a protective diode D139 is similarly connected. When the voltage level at line 1000 drops below a predetermined threshold, output line 1014 assumes a logic low condition which is imparted to line 976 to, in turn, turn off transistor Q17 and energize fault LED31 in a steady state fashion. Next, the noted utility voltage (+5AUX) is monitored at line 1016 incorporating input resistor R115 and extending to the positive input terminal of a comparator 1018. The 2.5 volt reference (2.5REF) is presented to the negative input of device 1018 from lines 960 and 1020. A resistor R116 is coupled between line 1016 and ground as is a capacitor C131. Additionally, line 960 is seen to incorporate resistor R117 and extends thereafter to ground.

Upon the occasion of a logic low voltage value at line 976, the network 950 also promulgates a fail signal (FAIL), which is logic low true, to the system user through its output connector. To derive this signal, line 976 is tapped at line 1022 which, in turn, is coupled to the gate of transistor Q18. The source of transistor Q18 is coupled to ground by line 1024 and its drain is coupled by line 1026 and resistor R18 to the distribution bus 400 (+12BUS). Line 1026, in turn, is coupled by line 1028 to the gate of transistor Q19. A resistor R119 is coupled between line 1028 and ground. The source of transistor Q19 is coupled to ground by line 1030, while its drain is connected by line 1032, containing resistor R120, to the FAIL signal output of control board 260. With the arrangement shown, when line 976 is at a logic high level, transistor Q18 is conducting and, thus, gate drive is removed from transistor Q15. However, with the presence of a fault defining logic low level at line 976, transistor Q18 is turned off and transistor Q19 is gated into conduction to provide a logic true low value at line 1032 to establish the noted FAIL output signal.

Figure 23:
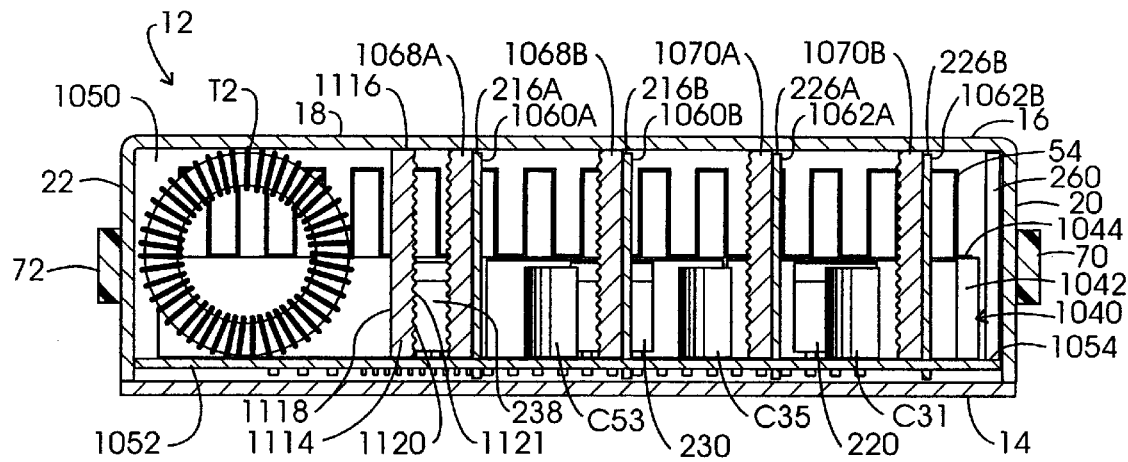
FIG. 23 is a sectional view taken through the plane 23—23 shown in FIG. 22.
Figure 22:
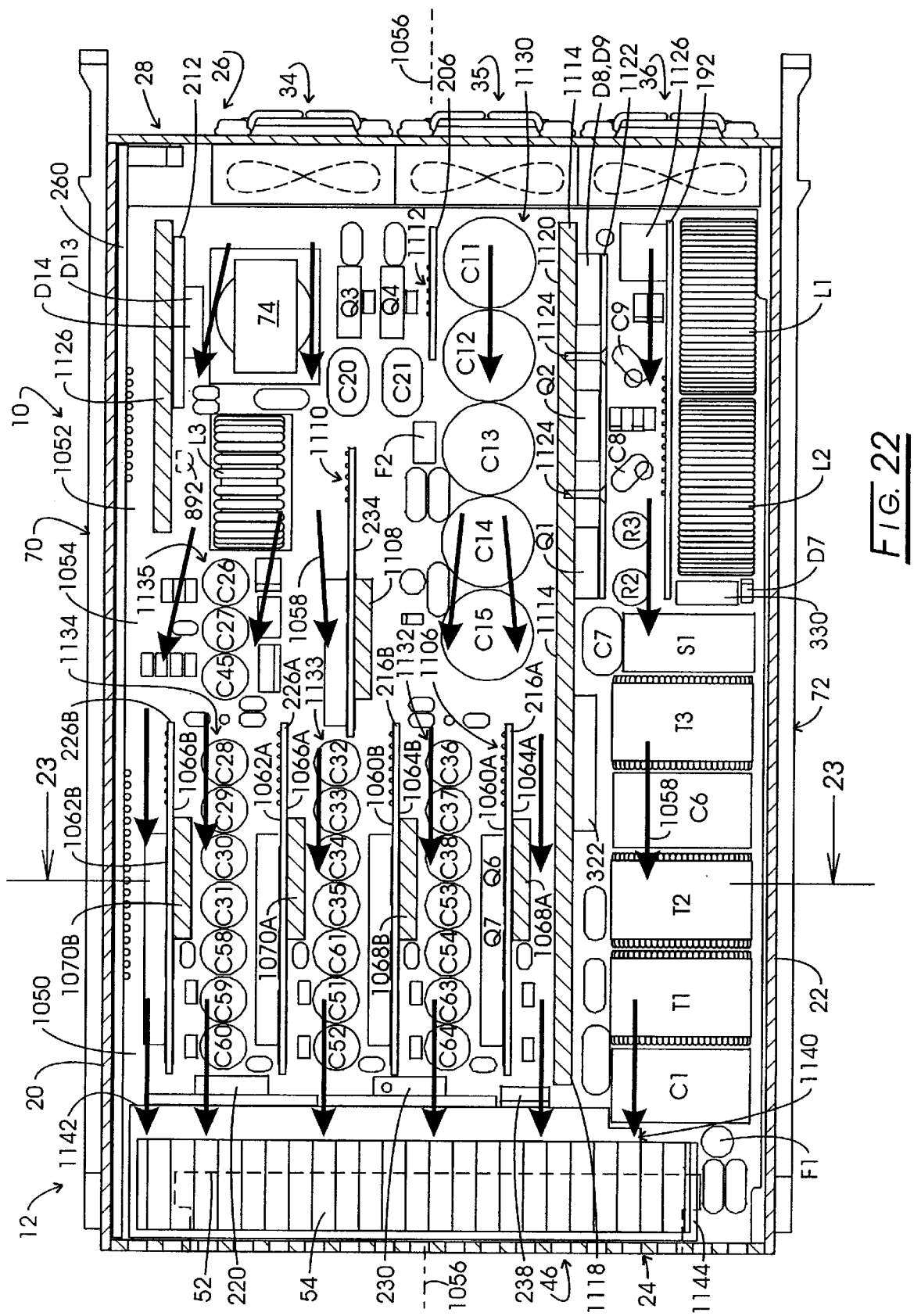
FIG. 22 is a sectional view taken through the plane 22—22 shown in FIG. 4.

Principal components of the circuitry now having been described, the instant description turns to the techniques by which the many circuit components involved are retained in a housing 12 of diminutive size and how the principal heat generating circuit components are located and mounted for the purposes of heat management. Referring to FIGS. 22 and 23, the internal cavity 1050 of housing 12 is revealed. Within the cavity 1050 in relatively closely spaced adjacency to the bottom 14, is a motherboard form of circuit board. The motherboard 1052 is formed with an upwardly disposed surface 1054 upon which both discrete circuit components, as well as the earlier-described daughter boards are mounted. The motherboard 1052 additionally is formed with a main printed circuit to which the daughter boards and circuit components are electrically coupled. A longitudinal axis 1056 is represented in FIG. 22 for the purpose of illustrating the orientation of the components with respect to paths of driven air. In this regard, fans 34–36 are seen positioned at the forward end of housing 12 within the cavity 1050. When actuated, those fans provide a path of driven air represented by arrows, certain of which are identified at 1058, which pass through the cavity 1050 and exit from a rearward air transfer opening 46, as well as the earlier described upper rearward air transfer opening 48 (FIG. 1). Located adjacent to the rearward air transfer opening 46 is the earlier-noted folded fin heat exchanger array 54. The daughter boards and circuit components are mounted in through-hole" fashion upon circuit board 1052 and are electrically coupled with a main printed circuit formed with it. Note that essentially all of the daughter boards and related components extend normally or perpendicularly to the upper surface 1054 of the circuit board 1052. The daughter boards and important or larger circuit components identified in the earlier disclosed circuitry are again identified with the same identifiers, either numeric or alphanumeric. Paired daughter boards which combine to comprise the synchronous buck d.c.-to-d.c. converter providing a regulated 5 volt output, as discussed above in conjunction with FIGS. 6, 11, 16A and 16B are shown extending normally or perpendicularly upwardly from the upper surface 1054 of motherboard circuit board 1052. In similar fashion, the synchronous buck d.c.-to-d.c. converter assemblage deriving a 3.3 volt regulated output are shown to be similarly paired and identified at 226A and 226B. Note that these daughter boards 216A, 216B and 226A, 226B are all aligned in parallel with the longitudinal axis 1056 and, correspondingly with the driven airflow generated by fans 34–35. Because these circuits perform in conjunction with an output from the noted distribution bus 400, they are configured with a surface mount architecture and represent relatively simple circuits which can be produced at higher volume utilizing robotic component placement equipment. These surface mount components are mounted upon the front faces of the equipment. These surface mount components are mounted upon the front faces of the daughter boards. In this regard, the front faces of daughter boards 216A and 216B are represented respectively at 1060A and 1060B, while the front faces of daughter boards 226A and 226B are revealed respectively at 1062A and 1062B. Surface mount components located on these front faces are quite thin and impose little obstruction to the generally linear flow of driven air through the cavity 1050. The back faces of daughter boards 216A and 216B are shown respectively at 1064A and 1064B, while the back faces of daughter boards 226A and 226B are shown respectively at 1066A and 1066B. The circuit board thickness defined between the front and back faces of these daughter boards is thinner than that of conventional circuit board structuring. In this regard, these daughter boards have a thickness of about 0.047 inch. This thinness is provided in support of a heat transfer arrangement which involves flat metal heat sinks which are attached to the back faces of the circuit boards. In this regard, an aluminum flat metal heat sink 1068A is attached to back face 1064A, and a heat sink 1068B is attached to the back face 1064B. A flat metal heat sink 1070A is attached to back face 1066A of daughter board 226A and a flat metal heat sink 1070B is attached to the back face 1066B of daughter board 226B.

As noted above, the circuitry associated with the daughter boards 216A, 216B and 226A, 226B is essentially identical. So also is the layout of components and structuring of these boards. Looking to FIG. 24, a view of the front face of daughter circuit board 216A is revealed. This same circuit board has been described above in connection with FIGS. 11, 16A and 16B. Accordingly, the principal component identification employed in those figures is repeated in FIG. 24. Note in the figure that the power switching transistors Q6 and Q7 are mounted in spaced-apart but paired adjacency and exhibit a generally rectangular periphery. Similarly, power switching transistors Q8 and Q9 are mounted on the circuit board in such spaced apart paired adjacency. Looking additionally to FIG. 25, it may be observed that a rectangular, thermally conductive conductor plate 1072 is abuttably positioned against the outwardly disposed surfaces 1074 and 1076 of respective transistors Q6 and Q7. Plate 1072 acts, inter alia, as a heat sink and is attached to flat plate heat sink 1068A with a thermally conductive machine screw 1078. Note that screw 1078 extends through a hole 1080 within the daughter board 216A to a threaded engagement within the threaded bore 1082 formed within the heat sink 1068A. Extending through the thin daughter board beneath or at the mounting positions of the transistors Q6 and Q7 are a plurality of metal covered channels or holes certain of which are revealed at 1084 behind transistor Q6 and certain of which are revealed at 1086 behind transistor Q7. Preferably, the holes are filled with a thermally conductive metal, for example, a common solder. The holes function as a thermal or heat transfer conduit between the back sides of transistors Q6 and Q7 positioned against front face 1060A and the heat sink 1068A.

A similar heat sink construction is provided in conjunction with transistors Q8 and Q9. As seen in FIG. 24, a conductor plate 1088 is positioned against the front faces of transistors Q8 and Q9 and functions, inter alia, as a heat sink. The conductor plate 1088 is fastened to heat sink 1068A by a thermally conductive machine screw 1090. Behind transistor Q8 are a plurality of metal covered channels or holes certain of which are revealed at 1092, while a corresponding plurality of channels or holes which are metal covered and preferably filled with solder are represented at 1094 positioned behind transistor Q9. The outwardly disposed surfaces of the flat aluminum heat sinks or at 1068A may be formed with an array of surface area increasing serrations arranged in parallel with axis 1056 (FIG. 22) to enhance heat exchange. Such serrations are seen in FIG. 2.

The daughter boards as at 216A are configured having a lower disposed support edge as represented generally at 1096, the profile of which includes downwardly extending tabs 1098–1100 which carry relatively large area copper pads as revealed generally at 1102–1104 with respect to tabs 1098–1100. These pads are provided for the purpose of accommodating the potentially larger currents, e.g. 35 amps, which may be outputted to the earlier-described ORing or blocking diodes, for example as described at 220 in FIG. 15. Inputted and outputted signals are transmitted and received at a pin array shown generally at 1106.

In general, the discrete circuit components not implemented using surface mount technology are mounted upon the motherboard circuit board 1052 utilizing through-hole and wave soldering techniques. The daughter board tabs and pins at their lower peripheries are mounted within slots (not shown) formed within the circuit board 1052. Following wave soldering, they are rigidly retained in an orientation normal to the upper surface 1054.

Returning to FIG. 22, the very thin structuring of the surface mount components is revealed. Additionally, by being arranged normally to the surface 1054 and in parallel with the driven air path, the daughter boards function to define linear pathways of driven air adjacent both their front and back sides as represented by the air path arrows adjacent them. The buck-boost d.c.-to-d.c. converter described at 234 in connection with FIGS. 6 and 13 is represented in FIG. 22 with that numeration and is located forwardly of the daughter boards 216A, 216B and 226A, 226B. In effect, the daughter board 234 is positioned earlier in the driven air path, inasmuch as the amount of heat dissipated by its power switching transistors is not as great as that developed by the earlier-described daughter boards. However, the daughter board assemblage 234 is structured in the same manner and employs surface mount topology. As before, the circuit board 234 is mounted upon the motherboard circuit board 1052 in a fashion wherein it is normal or perpendicular to the upper surface 1054. The switching transistors mounted upon this daughter board are combined with a flat aluminum plate heat sink 1108 in the same manner as described above in connection with FIGS. 24 and 25. Additionally, the earlier-noted tab structures are employed along with a pin array, the latter being seen at 1110. As before, the daughter board 234 is aligned in parallel with longitudinal axis 1056 and, thus, with the driven air path.

Positioned still more forwardly is the daughter board carrying the inverter control function 206, as described in connection with FIGS. 6 and 10 and represented with the same numeration in FIG. 22. While carrying surface mount components, the daughter board 206 is not combined with heat sink plates and the like but is mounted upon the motherboard circuit board 1052 in an orientation normal or perpendicular to upwardly disposed surface 1054. The pin array providing both electrical and structural connections is represented in general at 1012.

The somewhat larger circuit components of the EMI filter network and the a.c.-to-d.c. boost converter carrying out power factor corrections are located within air pathway corridor adjacent side 22 and extending rearwardly from fan 36. This corridor is further defined by an aluminum, elongate flat heat transfer plate 1114. Plate 1114 has a top side 1116 as seen in FIG. 23 which is connected in heat transfer relationship with the underside of the top cover 18. Connection is provided by certain of the machine screws as described at 56 of FIG. 1. Plate 1114 extends from the underside of the top cover 18 to perpendicular adjacency with the upwardly disposed surface 1054 of the motherboard circuit board 1052. Additionally, as seen in FIG. 22, the heat transfer plate 1114 is aligned in parallel relationship with longitudinal axis 1056 and with the direction of the driven air path. Side surface 1118 of the plate 1114 defines the corridor or air pathway with housing side 22. The oppositely disposed side surface 1120 of the heat transfer plate 1114 is configured with an array of longitudinally disposed serrations seen at 1121 in FIG. 23, which function to enlarge its surface area so as to evoke an improved heat transfer with air pathways formed from the driven air evoked, for instance, from fan 35. Attached in thermal communication with the side surface 1118 of heat transfer plate 1114 are certain of the higher heat generating circuit components of the input treatment network 182 and particularly, the a.c.-to-d.c. boost converter 188 employed to carry out power factor control. In this regard, power switching transistors Q1 and Q2 are attached in heat transfer communication with side surface 1118 as is an assemblage of diodes D8 and D9. Those components are retained against the surface 1118 by a steel bar 1122 which is attached to plate 1114 by machine screws 1124. Additionally, the rectifier described in connection with FIG. 7A at 322 is attached in heat exchange communication with the side surface 1118 of plate 1114. Thus, the heat generated by these components is dissipated both by air flow at either side of the plate 1114 and by heat conduction into the relatively thick aluminum top cover 18. Additionally, the driven air generated from fan 36 is substantially dedicated to these components and exits from the rearward opening 24 as well as the upward rearward opening 46. It may be noted that positioned within the corridor or air pathway between housing side 22 and plate side surface 1118 are such components as the power factor control daughter board 192 upon which a transformer 1126 is mounted, the inductors L1 and L2, transformers T1–T3, the relay activated switch S1 varrister 330 and capacitors C1 and C6. A similar heat management arrangement is provided in conjunction with rectifier component 212 which incorporates diodes D13 and D14 described in connection with FIG.

7B. The rectifier 212 is mounted upon and supported vertically by the motherboard circuit board 1052. It is attached in heat transfer communication with a flat aluminum heat transfer plate 1126 which, in turn, is connected to the top cover 18 by machine screws. Accordingly, the relatively thick aluminum cover is used for heat sinking purposes for this rectifier 212. Cooling also is provided by the air flow passing by it. It may be noted that the plate 1126 extends from the top cover attachment to adjacency with the motherboard circuit board 1052 upper surface 1054 and that the plate is aligned in parallel with longitudinal axis 1056 so as to promote linear air flow.

The physically largest capacitors employed with the power supply 10 are the hold-up capacitors C11–C15 described in conjunction with FIG. 7B. These cylindrically-shaped devices are mounted as an array 1130 upon the motherboard circuit board 1052 and extend normally or perpendicularly upwardly from upwardly disposed surface 1054. Note, however, that they are linearly aligned in parallel with longitudinal axis 1056 and are positioned in mutual adjacency. Accordingly, the linear array of capacitors confront the air path with minimal surface area and provide no significant obstruction to its desirable linear movement.

In similar fashion, the substantial number of smaller, cylindrically-shaped capacitors described, for example, in conjunction with FIGS. 8 and 15 also are supported and connected to the motherboard circuit board 1052 and extend normally or perpendicularly upwardly from its upwardly disposed surface 1054. These filter capacitors are grouped within linearly aligned arrays in mutual adjacency. Such arrays are, for example, identified at 1132–1135. Note that each array is aligned in parallel with the longitudinal axis 1056 and thus with the longitudinally directed driven air path evoked from fans 34 and 35.

As indicated above, those circuit components of the power supply 10 which generate the largest amount of heat are the blocking or ORing diodes symbolically represented at 220, 230 and 238 as described in connection with FIG. 6 and further identified in FIG. 15. These devices are passive in the sense that they do not partake in switching activities or the like and, thus can be permitted to perform at relatively higher temperatures. The layout architecture of power supply 10 recognizes this and positions them essentially at the most rearward location in the driven air path and, further, locates them in thermal exchange relationship with the folded fin heat exchanger array 54, as well as beneath the upper rearward air transfer opening 48.

Returning to FIG. 22, and looking additionally to FIGS. 23 and 26, it may be observed that the multiple pin connector 52, which is mounted upon the motherboard circuit board 1052 utilizes a considerable amount of the space available at the rearward region of housing 12. Diode assemblies 220, 230 and 238 are mounted vertically upon the motherboard circuit board 1052 and in heat exchange communication with a thermally conductive heat transfer component represented generally at 1140. FIG. 26 reveals that the heat transfer component 1140 has a generally "L-shaped" configuration with a forward portion 1142 extending normally or perpendicularly upwardly from the upwardly disposed surface 1054 of motherboard circuit board 1052. Diode assemblies 220, 230 and 238 are connected to this forward portion in heat exchange relationship. Forward portion 1142 is integrally connected with a generally horizontal top portion 1144 which is positioned over the top of multiple pin connector 52. Attached to the top surface of top portion 1144 is the thin sheet metal folded fin heat exchanger array 54 through which driven air passes in a heat exchange relationship. Attachment with the top portion 1144 is with a thermally conductive adhesive. With the arrangement shown, the 70 watts of power produced by these diodes, which is manifested as heat, is positioned at the rearmost region of the housing 12. It may be observed in connection with FIG. 26, that the heat exchanger 54 does not touch the top cover 18, a condition which may otherwise interfere with the heat sink performance of that top cover. The folded fin heat exchanger array 54 is fabricated by machine bending such that it represents an alternating sequence of channels which are open at the top and bottom in a vertical sense, and troughs which are outwardly open. The channel and troughs have a generally U-shaped rectangular cross-sectional configuration. Array 54 is not an extrusion and is formed of thin sheet aluminum having a thickness greater than about 0.020 inch and less than about 0.10 inch. A preferred thickness is about 0.012 inch. The adhesive layer attaching it to the top portion 1144 of heat transfer component 1140 will have a thickness of less than about 0.001 inch.

The figures also reveal the elongate vertically mounted control board 260. Carrying surface mount components, the larger ones of which are identified in common with the earlier circuit related figures, the daughter board circuit board 260 is mounted vertically and in adjacency with the housing side 20, inasmuch as components mounted thereon do not contribute a significant amount of heat to the cavity 1050. Note, additionally, that the circuit board 260 supports the LED components 30–32.

FIG. 26 reveals that the motherboard circuit board 1052 is mounted upon the sheet metal bottom side 14 of housing 12 utilizing bolts as at 1146 which threadably engage nut structures 1148 embedded within the sheet metal bottom 14 which are structured in the manner of stand-offs.

Since certain changes may be made in the above-described apparatus without departing from the scope of the invention herein involved, it is intended that all matter contained in the description thereof or shown in the accompanying drawings shall be interpreted as illustrative and not in a limiting sense.

What is claimed is:

1. A power supply connectable with a power input to provide multiple regulated outputs, comprising:

an input treatment network responsive to said power input to derive an interim voltage output of first value within a primary circuit domain;

an inverter network within said primary circuit domain, responsive to said interim voltage and responsive to an inverter control input to derive an unregulated alternating voltage output of second value less than said first value at an output within a secondary circuit domain;

an inverter control network coupled with said inverter network and deriving said inverter control input;

a rectifier network within said second circuit domain responsive to said alternating voltage output to derive a distribution output at a d.c. voltage level corresponding with said alternating voltage output;

a first d.c.-to-d.c. converter, within said secondary circuit domain responsive to said distribution output and to a first converter enable control input to derive a first one of said regulated outputs at a first voltage value;

a second d.c.-to-d.c. converter, within said secondary circuit domain, responsive to said distribution output and to a second converter enable input to derive a second one of said regulated outputs at a second voltage value independent of said first one of said outputs; and control circuit within said secondary circuit domain, electrically coupled with said first and second d.c.-to-d.c. converters and deriving said first and second converter enable control inputs.

2. The power supply of claim 1 in which said first and second d.c.-to-d.c. converters are comprised of circuits formed with surface mount components.

3. The power supply of claim 1 in which said distribution output d.c. voltage level is about 12 volts.

4. The power supply of claim 1 including a fuse intermediate said input treatment network and said inverter network.

5. Power supply apparatus for providing regulated d.c. outputs to an electrical system supported by a rack having an accessible forward portion and a power input comprising:

a housing supported within said rack having an accessible forward end with a forward air transfer opening located at said rack forward portion, said housing extending longitudinally rearwardly to a rearward end with a rearward air transfer opening and having a top cover formed of thermally conductive material, a bottom and oppositely disposed sides to define an internal cavity within which is a generally longitudinally directed driven air path;

a motherboard circuit board having an upwardly disposed surface supporting a main printed circuit, mounted within said cavity adjacent to and in parallel with said bottom;

an input treatment network responsive to said power input to derive an interim voltage output of first value within a primary circuit domain;

an inverter network within said primary circuit domain, responsive to said interim voltage and to an inverter control input to derive an unregulated alternating voltage output of second value less than said first value at an output within a secondary circuit domain;

an inverter control network within said primary circuit domain coupled with said inverter network and deriving said inverter control input;

a rectifier network within said second circuit domain, responsive to said alternating voltage output to derive a distribution output at a d.c. voltage level corresponding with said alternating voltage output;

a first d.c.-to-d.c. converter within said secondary circuit domain, having first power switching transistors, responsive to said distribution output and to a first converter enable control input to derive a first one of said regulated d.c. outputs at a first voltage value;

a second d.c.-to-d.c. converter, within said secondary circuit domain, having second power switching transistors, responsive to said distribution output and to a second converter enable input to derive a second one of said regulated d.c. outputs at a second voltage value;

a control circuit within said secondary circuit domain, electrically coupled with said first and second d.c.-to-d.c. converters and deriving said first and second converter enable control inputs;

a first daughter circuit board having front and back oppositely disposed faces spaced apart a circuit board thickness and a first connector carrying support edge of predetermined profile, and being supported by said motherboard circuit board at said first support edge in an orientation normal to said upper surface and aligned in parallel with said driven air path to define air pathways passing adjacent said front and back faces;

said first d.c.-to-d.c. converter being formed with surface mount components attached to said first daughter circuit board front face and electrically coupled from said first connector carrying support edge with said distribution output and said control circuit through said main printed circuit;

a second daughter circuit board having front and back oppositely disposed faces spaced apart a said circuit board thickness and a second connector carrying support edge of predetermined profile, and being supported by said motherboard circuit board at said second support edge in a orientation normal to said upper surface and aligned in parallel with said driven air path to define air pathways passing adjacent said front and back faces; and said second d.c.-to-d.c. converter being formed with surface mount components attached to said second daughter circuit board front face and electrically coupled from said second connector carrying support edge with said distribution output and said control circuit through said main printed circuit.

6. The power supply apparatus of claim 5 in which:

said first and second daughter circuit boards are configured having a plurality of metal covered channels extending from said front face to said back face underneath the mounting positions of said respective first and second power switching transistors and being in thermal exchange communication therewith; and including first and second flat metal heat sinks, each having an inner surface attached to a said back face in thermal exchange communication with said metal covered channels.

7. The power supply apparatus of claim 6 in which said plurality of channels are filled with a thermally conductive metal.

8. The power supply apparatus of claim 5 in which said circuit board thickness of said first and second daughter circuit boards is about 0.047 inch.

9. The power supply apparatus of claim 6 in which:

said first power switching transistors are mounted upon said first daughter circuit board in spaced apart paired adjacency, each such first power switching transistor having an outwardly disposed surface;

including a thermally conductive connector plate abuttably positioned against each said outwardly disposed surface; and a thermally conductive connector connecting said connector plate with said first flat metal heat sink through said first daughter circuit board.

10. The power supply apparatus of claim 5 in which:

said housing includes an upper rearward air transfer opening extending within said top cover forwardly from said rearward end;

including a multiple pin connector configured for circuit completing engagement with a corresponding connector of said electrical system, having a forwardly facing surface, a bottom surface supported adjacent said rearward end and a top surface spaced below said upper rearward air transfer opening to define a rearward air transfer passageway extending to said rearward air transfer opening and said upper rearward air transfer opening, and being in electrical communication with said main printed circuit;

a thermally conductive heat transfer component with a forward portion extending normally upwardly from said motherboard circuit board upwardly disposed surface adjacent said connector forwardly facing surface and a top portion extending in adjacency over said connector top surface;

including first and second blocking diode assemblies respectively coupled with said main printed circuit to receive said first and second regulated d.c. outputs and coupled in thermal exchange relationship with said heat transfer component forward portion; and a thin sheet metal folded fin heat exchanger array mounted in heat exchange relationship with said heat transfer component top portion, having parallel channels aligned for receiving driven air passing within said rearward air transfer passageway and directing it through said rearward air transfer opening.

11. The power supply apparatus of claim 10 including a fan assemblage mounted within said housing at said forward air transfer opening and actuable to generate said driven air path moving from said forward air transfer opening through said internal cavity and outwardly from said rearward air transfer opening and said upper rearward air transfer opening.

12. The power supply apparatus of claim 10 in which said folded fin heat exchanger array is spaced in non-contacting relationship from said housing top cover and located in adjacency with said upper rearward air transfer opening.

13. The power supply apparatus of claim 5 in which:

said housing top cover is formed of thermally conductive material;

said input treatment network includes heat generating input treatment circuit components electrically coupled with said main printed circuit;

including an elongate, flat thermally conductive first heat transfer plate, having a top side connected in heat transfer relationship with said housing top cover, extending from said top cover to perpendicular adjacency with said motherboard circuit board upwardly disposed surface, having a first surface spaced from and parallel with a said housing side and said driven air path to define an air pathway therebetween, and having an oppositely disposed second surface within said driven air path; and said heat generating input treatment circuit components being connected in heat transfer relationship with said first heat transfer plate.

14. The power supply apparatus of claim 11 in which:

said first heat generating input treatment circuit components are connected with said heat transfer plate first surface; and said first heat transfer plate second surface is configured with an array of surface area enlarging longitudinally disposed serrations.

15. The power supply apparatus of claim 14 in which said heat generating input treatment circuit components comprise power switching transistors and diodes.

16. The power supply apparatus of claim 5 in which:

said housing top cover is formed of thermally conductive material;

said rectifier network comprises diodes which generate heat while deriving said distribution output;

including a flat, thermally conductive second heat transfer plate having a top side connected in heat transfer relationship with said housing top cover, extending from said top cover to perpendicular adjacency with said motherboard circuit board upwardly disposed surface, having a component mount surface aligned with said longitudinally directed driven air path; and said diodes are coupled in heat transfer relationship with said component mount surface.

17. The power supply apparatus of claim 5 in which:

said input treatment network includes a plurality of hold-up capacitors chargeable from said interim voltage output; and said holdup capacitors are supported upon said motherboard circuit board upwardly disposed surface, extend upwardly normally thereto and are linearly aligned in mutual adjacency longitudinally within and in parallel with said driven air path.

18. The power supply apparatus of claim 5 including:

a plurality of filter capacitors coupled with said distribution output; and said filter capacitors are supported upon said motherboard circuit board upwardly disposed surface, extend upwardly normally thereto and are grouped within linearly aligned within and arrays in mutual adjacency, each such array being aligned in parallel with said longitudinally directed driven air path.

19. The power supply apparatus of claim 12 in which:

said first and second daughter circuit boards are configured having a plurality of metal covered channels extending from said front face to said back face underneath the mounting positions of said respective first and second power switching transistors and being in thermal exchange communication therewith, and including first and second flat metal heat sinks, each having an inner surface attached to a said back face in thermal exchange communication with said metal covered channels.

20. The power supply apparatus of claim 19 including a fan assemblage mounted within said housing at said forward air transfer opening and actuable to generate said driven air path moving from said forward air transfer opening through said internal cavity and outwardly from said rearward air transfer opening and said upper rearward air transfer opening.

21. The power supply apparatus of claim 19 in which:

said housing top cover is formed of thermally conductive material;

said input treatment network includes heat generating input treatment circuit components electrically coupled with said main printed circuit;

including an elongate, flat thermally conductive first heat transfer plate, having a top side connected in heat transfer relationship with said housing top cover, extending from said top cover to perpendicular adjacency with said motherboard circuit board upwardly disposed surface, having a first surface spaced from and parallel with a said housing side and said driven air path to define an air pathway therebetween; and having an oppositely disposed second surface within said driven air path; and said heat generating input treatment circuit components being connected in heat transfer relationship with said first heat transfer plate.

22. The power supply apparatus of claim 21 in which:

said rectifier network comprises diodes which generate heat while deriving said distribution output;

including a flat, thermally conductive second heat transfer plate having a top side connected in heat transfer relationship with said housing top cover, extending from said top cover to perpendicular adjacency with said motherboard circuit board upwardly disposed surface, having a component mount surface aligned with said longitudinally directed driven air path; and said diodes are coupled in heat transfer relationship with said component mount surface.

23. The power supply apparatus of claim 10 in which:

said housing top cover is formed of thermally conductive material;

said input treatment network includes heat generating input treatment circuit components electrically coupled with said main printed circuit;

including an elongate, flat, thermally conductive first heat transfer plate, having a top side connected in heat transfer relationship with said housing top cover, extending from said top cover to perpendicular adjacency with said motherboard circuit board upwardly disposed surface, having a first surface spaced from and parallel with a said housing side and said driven air path to define an air pathway therebetween, and having an oppositely disposed second surface within said driven air path; and said heat generating input treatment circuit components being connected in heat transfer relationship with said first heat transfer plate.

24. The power supply apparatus of claim 13 in which:

said rectifier network comprises diodes which generate heat while deriving said distribution output;

including a flat, thermally conductive second heat transfer plate having a top side connected in heat transfer relationship with said housing top cover, extending [therefrom] from said top cover to perpendicular adjacency with said motherboard circuit board upwardly disposed surface, having a component mount surface aligned with said longitudinally directed driven air path; and said diodes are coupled in heat transfer relationship with said component mount surface.

25. A power supply connectable with a power input to provide multiple regulated outputs and exhibiting an overall wattage power rating of predetermined value, comprising:

an input treatment network responsive to said power input to derive an interim voltage output of first value within a primary circuit domain;

an inverter network within said primary circuit domain, responsive to said interim voltage and responsive to an inverter control input to derive an alternating voltage output of second value less than said first value at an output within a secondary circuit domain;

an inverter control network coupled with said inverter network and deriving said inverter control input;

a rectifier network within said second circuit domain responsive to said alternating voltage output to derive a distribution output at a d.c. voltage level corresponding with said alternating voltage output;

a first d.c.-to-d.c. converter, within said secondary circuit domain responsive to said distribution output and to a first converter enable control input to derive a first one of said regulated outputs at a first voltage value;

a second d.c.-to-d.c. converter, within said secondary circuit domain, responsive to said distribution output and to a second converter enable input to derive a second one of said regulated outputs at a second voltage value independent of said first one of said outputs; and a control circuit within said secondary circuit domain, electrically coupled with said first and second d.c.-to-d.c. converters and deriving said first and second converter enable control inputs said control circuit including a current detector network responsive to said alternating voltage output to derive a current signal corresponding with the value of current exhibited at said alternating voltage output, said current detector network being responsive to said current signal and to a comparison signal corresponding with said rating value to derive a limit signal when said current signal exceeds said comparison signal, and is responsive in the presence of said limit signal to effect termination of said first and second converter enable control inputs.

26. The power supply of claim 25 in which:

said control circuit includes a limit indicator energizable to provide a perceptible output; and said control circuit is responsive to energize said limit indicator in the presence of said limit signal.

27. The power supply of claim 25 in which said control circuit is responsive at the initiation of said limit signal to delay said termination of said first and second converter enable outputs for a predetermined delay interval.

28. The power supply of claim 27 in which said predetermined delay interval is about ten seconds.

29. The power supply of claim 25 in which:

said input treatment network includes an a.c. to d.c. boost converter responsive to said power input to effect power factor correction and to derive said interim voltage output of first value;

said inverter network includes a transformer stage having a secondary winding conveying said alternating voltage output of said second value, and a filter inductor responsive to said rectifier network output; and said current detector network is configured as an integrator responsive to current flow of given value within said filter inductor to derive said current signal.

30. The power supply of claim 29 in which:

said distribution output d.c. voltage level is substantially a constant voltage value in the absence of variations of said power input; and said current signal is linearly correlatable with the product of said given value of current flow and said constant voltage value.

31. A power supply connectable with a power input to provide multiple regulated outputs, comprising:

an input treatment network responsive to said power input to derive an interim voltage output of first value within a primary circuit domain;

an inverter network within said primary circuit domain, responsive to said interim voltage and responsive to an inverter control input to derive an alternating voltage output of second value less than said first value at an output within a secondary circuit domain;

an inverter control network coupled with said inverter network and deriving said inverter control input;

a rectifier network within said second circuit domain responsive to said alternating voltage output to derive a distribution output at a d.c. voltage level corresponding with said alternating voltage output;

a first d.c.-to-d.c. converter, within said secondary circuit domain responsive to said distribution output and to a first converter enable control input to derive a first one of said regulated outputs at a first voltage value;

a second d.c.-to-d.c. converter, within said secondary circuit domain, responsive to said distribution output and to a second converter enable input to derive a second one of said regulated outputs at a second voltage value independent of said first one of said outputs; and a control circuit within said secondary circuit domain, electrically coupled with said first and second d.c.-to-d.c. converters and deriving said first and second converter enable control inputs said control circuit including a voltage monitoring network responsive to said distribution output d.c. voltage level and to a reference corresponding with a predetermined threshold value of voltage for said distribution output to effect termination of said first and second converter enable outputs when said d.c. voltage level at said distribution output is below said threshold value.

32. The power supply of claim 31 in which:

said control circuit includes an input status indicator energizable to provide a perceptible output; and said control circuit is responsive to energize said input status indicator in the presence of said first and second converter enable outputs.

* * * * *